(12) United States Patent
Wooley et al.

(10) Patent No.: US 9,001,132 B1
(45) Date of Patent: Apr. 7, 2015

(54) CONSTRAINT SCENARIOS FOR RETARGETING ACTOR MOTION

(75) Inventors: Kevin Wooley, San Francisco, CA (US); Kiran S. Bhat, San Francisco, CA (US); Michael Sanders, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 188 days.

(21) Appl. No.: 13/324,808

(22) Filed: Dec. 13, 2011

Related U.S. Application Data

(60) Provisional application No. 61/426,218, filed on Dec. 22, 2010.

(51) Int. Cl.
*G06T 13/00* (2011.01)
*G09G 5/00* (2006.01)

(52) U.S. Cl.
CPC ........................................ *G09G 5/00* (2013.01)

(58) Field of Classification Search
USPC .......................................................... 345/474
See application file for complete search history.

(56) References Cited

U.S. PATENT DOCUMENTS

| | | | |
|---|---|---|---|
| 5,990,908 A * | 11/1999 | Thingvold | 345/474 |
| 2005/0001842 A1* | 1/2005 | Park et al. | 345/474 |
| 2008/0133189 A1 | 6/2008 | Criswell et al. | |
| 2008/0170076 A1* | 7/2008 | Giroux et al. | 345/473 |
| 2009/0262118 A1* | 10/2009 | Arikan et al. | 345/473 |
| 2010/0164862 A1 | 7/2010 | Sullivan et al. | |

OTHER PUBLICATIONS

Liu, C. Karen, and Zoran Popović. "Synthesis of complex dynamic character motion from simple animations." ACM Transactions on Graphics (TOG). vol. 21. No. 3. ACM, 2002.*
"An Inverse Kinematic Solver for a Two Link Chain" [online]. NYU Online, 2000, [retrieved on Dec. 13, 2011]. Retrieved from the Internet: <URL: http://mrl.nyu.edu/~perlin/gdc/ik/ik.java.html>, 2 pages.
"Inverse Kinematic Solver" [online] Orge Forums, 2009, [retrieved on Dec. 13, 2011]. Retrieved from the Internet: <URL: http://www.ogre3d.org/forums/viewtopic.php?f=11&t=52934 >. 9 pages.

(Continued)

*Primary Examiner* — Kimbinh T Nguyen
*Assistant Examiner* — Raffi Isanians
(74) *Attorney, Agent, or Firm* — Kilpatrick Townsend & Stockton LLP

(57) ABSTRACT

A computer-implemented method for providing retargeting of actor motion includes: receiving, in a computer system, an input generated by user selection of at least one of multiple real-time constraint scenarios, each real-time constraint scenario corresponding to a relationship between motion capture information from an actor and a position or movement of a character driven by the motion capture information; activating, based on the selected real-time constraint scenario, one or more of multiple limb solvers for the character which determines at least a first joint angle for a corresponding character limb; registering, for at least one character limb where the corresponding limb solver is not activated, a corresponding joint angle from the motion capture information as a second joint angle; and determining a root location for the character based on at least the first and second joint angles.

26 Claims, 22 Drawing Sheets

(56) References Cited

OTHER PUBLICATIONS

"Inverse Kinematics" [online]. Wikipedia Online, 2007, [retrieved on Dec. 13, 2011]. Retrieved from the Internet: <URL: http://web.archive.org/web/20071023010508/http:/en.wikipedia.org/wiki/Inverse_kinematics>. 2 pages.

Chen and Gao. "Closed-Form Inverse Kinematics Solver for Reconfigurable Robots." *Proceedings of the 2001 IEEE International Conference on Robotics and Automation*, Seoul, Korea, May 21-26, 2001, 6 pages.

Choi and Ko. "On-line Motion Retargetting." Academic Paper, SNU Human Animation Center, School of Electrical Engineering, Seoul National University, 2000, 11 pages.

Gleicher, M. "Motion Editing with Spacetime Constraints." *Proceedings of the 1997 Symposium on Interactive 3D Graphics*, 1997, 10 pages.

Gleicher, M. "Retargeting Motion to New Characters." Siggraph '98, 1998, 10 pages.

Hecker et al. "Real-time Motion Retargeting to Highly Varied User-Created Morphologies." SIGGRAPH, 2008, 11 pages.

Kovar et al. "Footskate Cleanup for Motion Capture Editing." *ACM SIGGRAPH Symposium on Computer Animation*, 2002, 8 pages.

Lee and Shin. "A Hierarchical Approach to Interactive Motion Editing for Human-Like Figures." Academic Paper, Computer Science Department, Korea Advanced Institute of Science and Technology, 1999, 10 pages.

Meredith and Maddock. "Using a Half-Jacobian for Real-Time Inverse Kinematics." Academic Paper, Department of Computer Science, University of Sheffield, United Kingdom, 2004, 8 pages.

Shin et al. "Computer Puppetry: An Importance-Based Approach." *ACM Transactions on Graphics*, vol. 20, No. 2, Apr. 2001, pp. 67-94.

Wu et al. "A 12-DOF Analytic Inverse Kinematics Solver for Human Motion Control." *Journal of Information and Computational Science*, vol. 1, No. 1, 2004, pp. 137-141.

Autodesk, "Autodesk Maya 2011, Getting Started" Chapter 6-7, 2010, downloaded from the internet at: http://images.autodesk.com/adsk/files/mb_usersguide.pdf on Jul. 10, 2012, 40 pages.

Autodesk, "Autodesk MotionBuilder 2010 User's Guide", Chapters 58-72 & 87, 2009, downloaded from the internet at: http://images.autodesk.com/adsk/files/mb_usersguide.pdf on Jul. 10, 2012, 208 pages.

Wikipedia, "Autodesk 3ds Max", Oct. 14, 2010, downloaded from the internet at: http://web.archive.org/web/20100520172821/http:/en.wikipedia.org/wiki/Autodesk_3ds_Max on Jul. 10, 2012, 5 pages.

Wikipedia, "Inverse Kinematics", Oct. 27, 2009, downloaded from the internet at: http://web.archive.org/web/20091120101413/http:/en.wikipedia.org/wiki/Inverse_kinematics on Jul. 11, 2012, 3 pages.

Wikipedia, "Solver", Oct. 25, 2011, downloaded from the internet at: http://en.wikipedia.org/wiki/Solver on Jul. 10, 2012, 2 pages.

\* cited by examiner

CONSTRAINT SCENARIOS FOR RETARGETING ACTOR MOTION

CROSS-REFERENCE TO RELATED APPLICATION

This application claims priority from U.S. Provisional Application Ser. No. 61/426,218, filed on Dec. 22, 2010, and entitled "Full Body Inverse Kinematics Motion Capture Retargeting System," the contents of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This document relates to motion capture retargeting.

BACKGROUND

Motion capture essentially involves a detailed detection of movement by a person (actor) or some physical object, and an application of the detected movement to a virtual character or other computer-generated object. The detection can be done by way of affixing markers on the actor's body and then detecting, while the actor is moving, the markers' position optically or electromagnetically, to name two examples. The detected positions are encoded in one or more ways, and the resulting information is often referred to as motion capture data.

If the character that is driven by the motion-capture data represents a human with proportions identical to those of the actor, then the application of the actor's motion to the character usually does not raise any serious issues. That is, for almost any movement that one seeks to impart to the character, the actor can generate the necessary motion capture data by performing essentially the same movement on the motion capture stage. The same is true if the character does not represent a human but nevertheless has a body of approximately human configuration and proportions. For example, the character is a robotic character having a torso with two arms, two legs, and a head.

However, if the character's body configuration and/or proportions are instead different from those of the actor, then the application of the actor's motion to the character can run into one or more problems. For example, if the legs of the character are much longer than the actor's legs, then each step taken by the actor will translate into a much greater stride taken by the character. This can be undesirable, for example when two or more actors are being motion captured together, because the positions of the characters relative to each other will not be the same as those of the two actors. If one actor shakes the other's hand, for example, it is possible that the characters at this moment are too far apart so that their "hands" do not meet. As another example, if the actor is standing next to a table on the motion capture stage, the character may at the same time stand some distance away from the virtual table. Also, other factors can differ, such as the relative eyeline from one character to the other.

SUMMARY

In a first aspect, a computer-implemented method for providing retargeting of actor motion includes: receiving, in a computer system, an input generated by user selection of at least one of multiple real-time constraint scenarios, each real-time constraint scenario corresponding to a relationship between motion capture information from an actor and a position or movement of a character driven by the motion capture information; activating, based on the selected real-time constraint scenario, one or more of multiple limb solvers for the character which determines at least a first joint angle for a corresponding character limb; registering, for at least one character limb where the corresponding limb solver is not activated, a corresponding joint angle from the motion capture information as a second joint angle; and determining a root location for the character based on at least the first and second joint angles.

Implementations can include any or all of the following features. At least one of the real-time constraint scenarios involves maintaining a pose of the actor. At least one of the real-time constraint scenarios involves maintaining a height proportion between the character and the actor. At least one of the real-time constraint scenarios involves imposing a ground constraint on the character. Each of the real-time constraint scenarios is associated with one or more parameter values for at least one of the limb solvers, and in response to the user selection the corresponding one or more parameter values are provided to the at least one of the limb solvers. The method further includes receiving another user input that is distinct from the motion capture information and that specifies a location for a part of the character, and adjusting the character so that the part of the character is at the specified location. The method further includes receiving another user input that is distinct from the motion capture information and that specifies a rotational offset for at least one character joint relative to the motion capture information, adjusting the character so that the character joint has the specified rotational offset, and propagating the rotational offset in a joint hierarchy based on the character joint. The method further includes receiving an additional user input that is also distinct from the motion capture information and that specifies an offset adjustment for the rotational offset, and modifying the character according to the offset adjustment, wherein the offset adjustment is not propagated in the joint hierarchy.

In a second aspect, a computer program product is tangibly embodied in a computer-readable storage medium and includes instructions that when executed by a processor perform a method. The method includes: receiving, in a computer system, an input generated by user selection of at least one of multiple real-time constraint scenarios, each real-time constraint scenario corresponding to a relationship between motion capture information from an actor and a position or movement of a character driven by the motion capture information; activating, based on the selected real-time constraint scenario, one or more of multiple limb solvers for the character which determines at least a first joint angle for a corresponding character limb; registering, for at least one character limb where the corresponding limb solver is not activated, a corresponding joint angle from the motion capture information as a second joint angle; and determining a root location for the character based on at least the first and second joint angles.

In a third aspect, a computer program product is tangibly embodied in a computer-readable storage medium, the computer program product including instructions that, when executed, generate on a display device a graphical user interface. The graphical user interface includes: a first area presenting a real-time view of a character driven by motion capture information from an actor; and a second area for a user to choose any of multiple real-time constraint scenarios, each real-time constraint scenario corresponding to a relationship between the motion capture information and a position or movement of the character, wherein, based on the selected real-time constraint scenario, one or more of multiple limb solvers for the character are activated which determines at least a first joint angle for a corresponding character limb, wherein for at least one character limb where the corresponding limb solver is not activated, a corresponding joint angle is registered from the motion capture information as a second joint angle, and a root location for the character is determined based on at least the first and second joint angles.

Implementations can include any or all of the following features. The second area includes a maintain pose control. The second area includes a maintain height control. The second area includes a ground constraint control. The graphical user interface further includes a third area for the user to specify, distinct from the motion capture information, a location for a part of the character, wherein the character is adjusted so that the part of the character is at the specified location. The graphical user interface further includes a third area for the user to specify, distinct from the motion capture information, a rotational offset for at least one character joint relative to the motion capture information, wherein the character is adjusted so that the character joint has the specified rotational offset, and the rotational offset is propagated in a joint hierarchy based on the character joint. The user also specifies, using the third area and distinct from the motion capture information, an offset adjustment for the rotational offset, wherein the character is adjusted according to the offset adjustment, and the offset adjustment is not propagated in the joint hierarchy.

In a fourth aspect, a system includes: a motion capture device that detects motion capture information from an actor; a stance solver and multiple limb solvers for a character driven by the motion capture information, the stance solver and multiple limb solvers receiving the detected motion capture information; and an input device receiving an input generated by user selection of at least one of multiple real-time constraint scenarios, each real-time constraint scenario corresponding to a relationship between the motion capture information and a position or movement of the character; wherein, based on the selected real-time constraint scenario, the system activates one or more of the limb solvers for the character which determine at least a first joint angle for a corresponding character limb, wherein for at least one character limb where the corresponding limb solver is not activated the system registers a corresponding joint angle from the motion capture information as a second joint angle, and wherein the stance solver determines a root location for the character based on at least the first and second joint angles.

Implementations can include any or all of the following features. The input device receives another user input that is distinct from the motion capture information and that specifies a location for a part of the character, and wherein the system adjusts the character so that the part of the character is at the specified location. The input device receives another user input that is distinct from the motion capture information and that specifies a rotational offset for at least one character joint relative to the motion capture information, and wherein the system adjusts the character so that the character joint has the specified rotational offset, and propagates the rotational offset in a joint hierarchy based on the character joint. The input device receives an additional user input that is also distinct from the motion capture information and that specifies an offset adjustment for the rotational offset, and wherein the system modifies the character according to the offset adjustment, and does not propagate the offset adjustment in the joint hierarchy.

Implementations can provide any or all of the following advantages. Motion capture retargeting can be made more flexible and user friendly. A retargeting system can offer a user multiple predefined real-time constraint scenarios to choose between, and the user can see the results of implementing them in real time. An artist (i.e., an animator) can match a character or a portion thereof to one or more reference positions. A motion capture retargeting system can allow the artist to match the head position, hand position, foot position, global root position of the actor, or any combination of these, when applying motion to a character.

DESCRIPTION

Figure 1A:
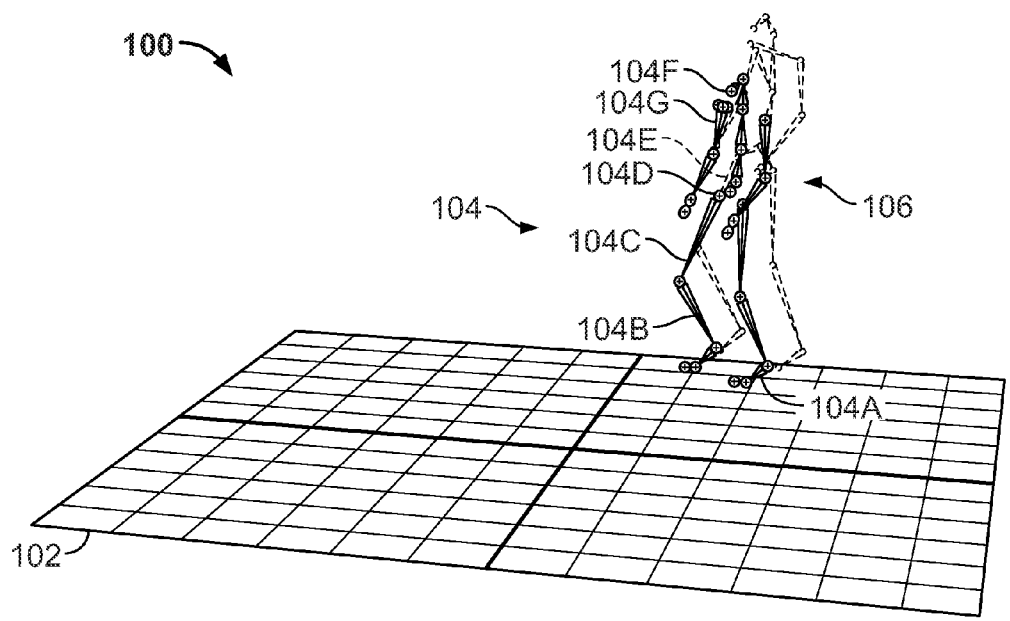
FIGS. 1A-F show example results of retargeting with scaling of root and feet positions.

This description relates to constraint scenarios for retargeting actor motion. Retargeting can involve applying the motion of one subject (e.g., a human actor) to another (e.g., a computer generated character). As another example, retargeting can involve applying one motion from one computer generated character to another.

In some implementations, a retargeting system has multiple real-time constraint scenarios that a user chooses between to set constraints for retargeting actor motion to a character. The real-time constraint scenarios enable on-the-fly composition by allowing retargeting to be performed in a creative phase (as opposed to, say, merely in a character-definition phase). Particularly, the retargeting system selectively applies constraints to one or more of multiple limb solvers for the character based on the selected real-time constraint scenario(s). For example, the retargeting system lets a director specify in real time one or more aspects of the actor's captured motion that should be preserved in the solver processing and hence applied to the character, where other aspects may not be preserved.

FIGS. 1A-F show example results of retargeting with scaling of root and feet positions. In some implementations, such scaling is one of multiple real-time constraint scenarios that a user can choose to apply when an actor's motion is retargeted.

For example, a user may select the scaling before the actor begins moving, or while the motion is being captured (e.g., if the user wishes to see the effect of scaled retargeting compared to some other real-time constraint scenario that is currently applied).

The retargeting is shown in a virtual space 100, for example a three-dimensional space defined in a computer and configured to have one or more characters, assets and/or other objects defined therein. In some implementations, one or more objects in the virtual space 100 is or will be animated, for example so that the animation can be rendered as a part of creating a computer based effect for a motion picture or other visual medium.

A plane 102 is here included in the virtual space 100. In some implementations, the plane 102 is defined throughout at least part of the virtual space 102, and can be used as a source of reference points when character position or motion is specified. For example, the plane 102 is here a ground plane and can be defined using a mesh of suitable density.

The virtual space 100 here includes an actor skeleton 104 and a character skeleton 106. Here, the character skeleton 106 is taller than the actor skeleton 104, but other proportions can be used. In some implementations, each of the actor skeleton 104 and the character skeleton 106 is defined as a computer based model having certain properties including, but not limited to: a certain body configuration (e.g., a torso with two arms, two legs and a head); the size of, and/or relative proportions between, various parts of the body; flexibility (e.g., one or more joints, and/or deformable body parts). For example, a joint is defined as connecting at least two bones with each other, and the joint allows the bones to assume certain positions relative to each other, for example corresponding to a human body.

Any suitable hierarchy can be used for the character(s) in the virtual space 100. In some implementations, the actor skeleton 104 is a determined hierarchy that does not fully match the human bone structure but that is a simplified version thereof. For example, the skeletons here have no rib cages and their hands and feet have substantially fewer bones than a human.

The actor skeleton 104 here represents motion capture data obtained from a human actor on a motion capture scene. That is, the actor's motion is captured and encoded into the motion capture data, which is then applied so that the actor skeleton 104 in the virtual space 100 takes the position(s) and undergoes the motion(s) detected from the actor. Any suitable motion capture technique can be used including, but not limited to, detectable markers on the actor's body, transmitting sensors on the actor's body, image recognition techniques, acoustic detection, and combinations thereof.

Here, the actor skeleton 104 includes two feet 104A that are each connected to a respective lower leg 104B by an ankle joint. The lower legs 104B are each connected to a respective thigh bone 104C by a knee joint. Each of the thigh bones 104C is connected to a pelvis 104D. The pelvis 104D, in turn, is connected to a spine 104E, which in turn carries a head 104F and respective arms 104G.

The character skeleton 106, in turn, is here the object that is being driven by the motion capture data. In some implementations, the character skeleton 106 is the underlying structure to be used for one or more characters in an animation. In other words, in such situations the actor is generating the motion capture data for the ultimate purpose of applying that data to the character skeleton 106 as part of animating the character. That is, the actor skeleton 104, which merely reflects the motion capture data, is then not intended to be used as any animated character. Rather, the actor skeleton 104 is here shown in the virtual space 100 to illustrate the position(s) and motion(s) of the actor on the motion capture stage.

Here, some parts of the character skeleton 106 in some sense correspond to those of a human body (e.g., the actor skeleton 104). For example, the character skeleton 106 has two legs with an articulated foot each, knee joints, a pelvis, a spine, a head and two arms with respective joints. However, the character skeleton 106 is taller than the actor skeleton 104 in the virtual space 100. Also, the proportions of the individual limbs of the character skeleton 106 to each other may differ from those of a human body (e.g., the actor skeleton 104).

Each of the actor skeleton 104 and the character skeleton 106 can have any suitable topology. In some implementations, the character skeleton 106 has a different topology than the actor skeleton 104. The character skeleton can have one or more extra bones or joints, for example additional spine joints and/or a reverse ankle dog leg.

The FIGS. 1A-F here show a series of images depicting the virtual space 100 at different times. For example, the images can be considered to be snapshots of an animated sequence, which in itself includes many more intervening images. That is, if the full set of images were displayed at a rapid pace, the display would give the visual impression of a more or less continuous motion by the actor skeleton 104 and the character skeleton 106.

Initially, the actor skeleton 104 and the character skeleton 106 can be placed at any arbitrary positions relative to each other in the virtual space 100. For example, the skeletons 104 and 106 can be placed some distance from each other on the plane 102 (e.g., as shown here), or they can initially be placed so that their bodies coincide with each other, at least in part (e.g., overlapping at their respective footprints and for part of their legs). In some implementations, the character skeleton 106 can have a different orientation than the actor skeleton 104, for example so that the character skeleton 106 extends downward from the plane 102 instead of upward.

FIGS. 1A-F show example results of retargeting with scaling of root and feet positions. In FIG. 1A, the actor skeleton 104 and the character skeleton 106 have respective initial positions. In this example, the character skeleton 106 is initially placed a bit behind the actor skeleton 104 as seen by the viewer (i.e., by the virtual camera).

Figure 1B:
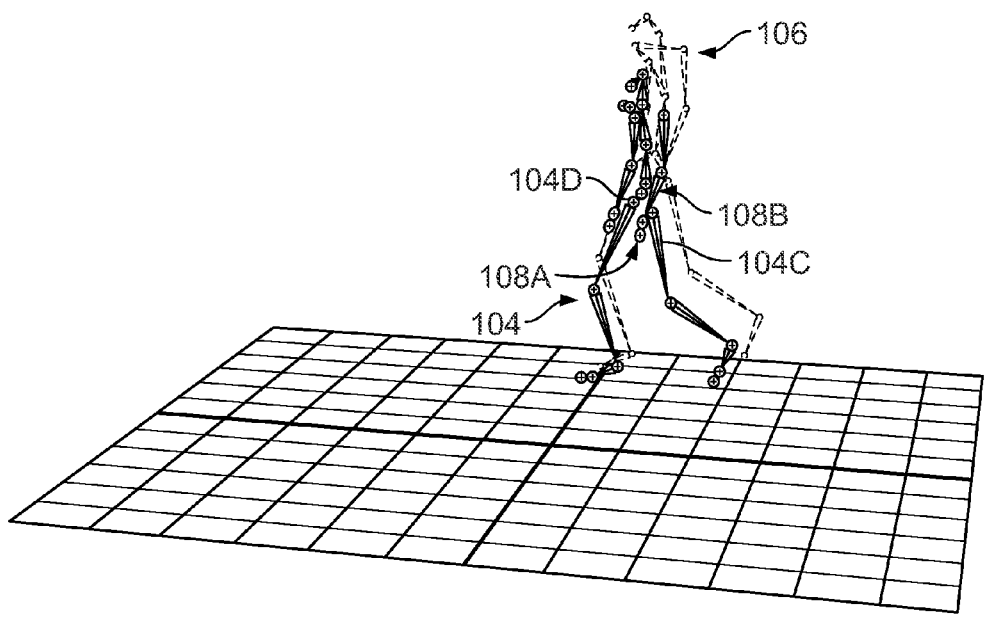

In FIG. 1B, the actor skeleton 104 and the character skeleton 106 are beginning to take a step forward with their respective right legs. That is, the actor skeleton 104 is advancing its right foot forward to take a step. The character skeleton, which is driven by the motion capture data from the actor skeleton 104, is accordingly also moving its right foot forward.

The root and feet of the character skeleton 106 are here scaled to those of the actor skeleton 104. That is, the motion that is applied to the character skeleton 106 is here scaled compared to that of the actor skeleton 104. For example, the character skeleton's foot in this example is brought forward a greater distance than that of the actor skeleton. In particular, the character skeleton's foot is advanced by an amount proportional to the size of the character skeleton's limbs. For example, the left thigh bone 104C forms a joint angle 108A relative to the pelvis 104D. In some implementations, the joint angle 108A of the actor skeleton is directly applied as a corresponding joint angle 108B on the actor skeleton 104.

Figure 1C:
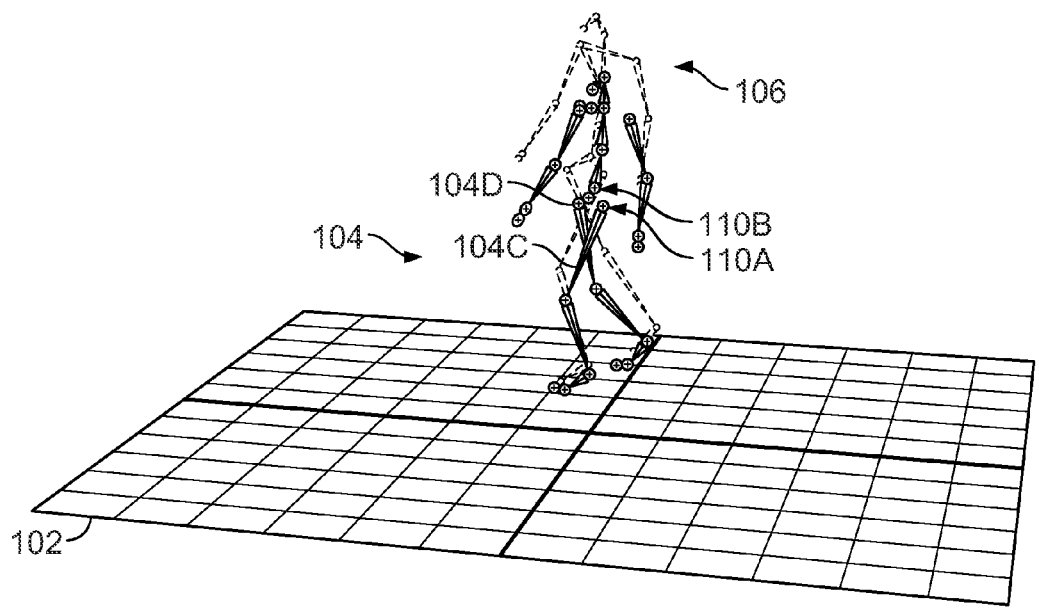

In FIG. 1C, the actor skeleton 104 and the character skeleton 106 have planted their right feet and are beginning to take another step forward with their respective left legs. The character skeleton's left foot has caught up with the actor skeleton's left foot compared to the earlier figures. This is a result of the skeletons' respective geometries and proportions, and of the scaling of the root and feet. For example, the left thigh bone 104C of the actor skeleton forms a joint angle 110A relative to the pelvis 104D. For the character skeleton 106, similarly, the stride is characterized by a joint angle 110B. In some situations, the actor skeleton's joint angle is directly applied to the character skeleton, and in such case the joint angle 110B is the same as the joint angle 110A. However, in some situations a constraint applies to the character skeleton, and as a result a separate value will be calculated for the joint angle 110B which could differ from the joint angle 110A.

Figure 1D:
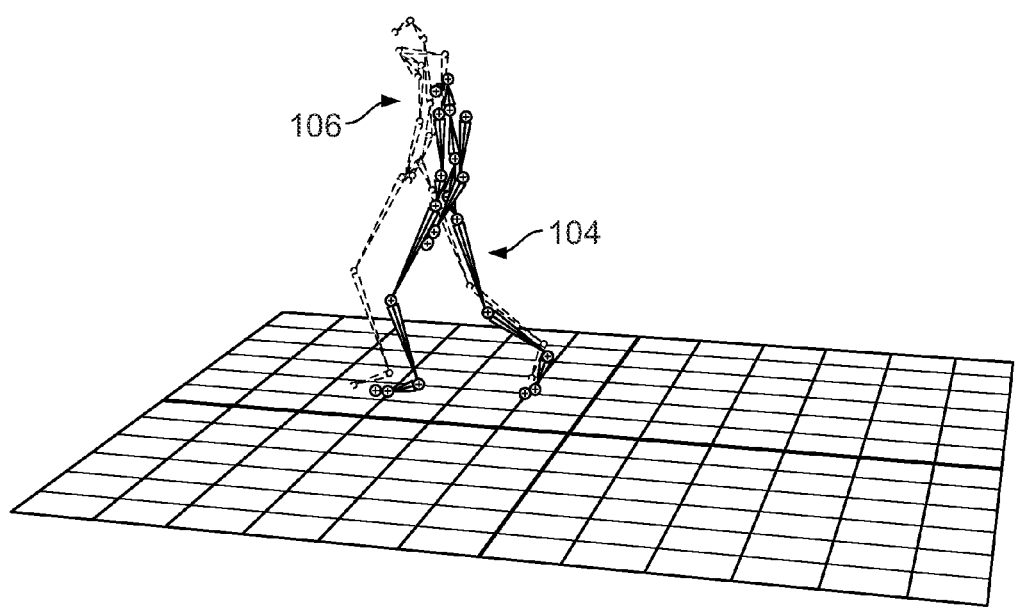

In FIG. 1D, the actor skeleton 104 and the character skeleton 106 have planted their left feet and are beginning to take yet another step forward with their respective left legs. The character skeleton is now a bit ahead of the actor skeleton compared to the earlier figures.

Because the character skeleton's legs are longer than those of the actor skeleton, the character skeleton is making a longer stride than the other skeleton in this example. That is, when the actor skeleton and the character skeleton set down their respective right feet—which happens essentially at the same time, provided that there is no significant delay in applying the motion capture data to the character skeleton—the character skeleton's right foot will be farther from the starting point than is the actor skeleton's right foot. The length discrepancy mentioned above occurs in every step taken by the skeletons. The difference can therefore add up over time and become noticeable.

In some implementations it is not the foot of the skeleton that drives the skeleton's movement, but rather this is done by the skeleton's ankle Nevertheless, an offset still occurs due to the scaling of motion between bodies of different proportions.

Figure 1E:
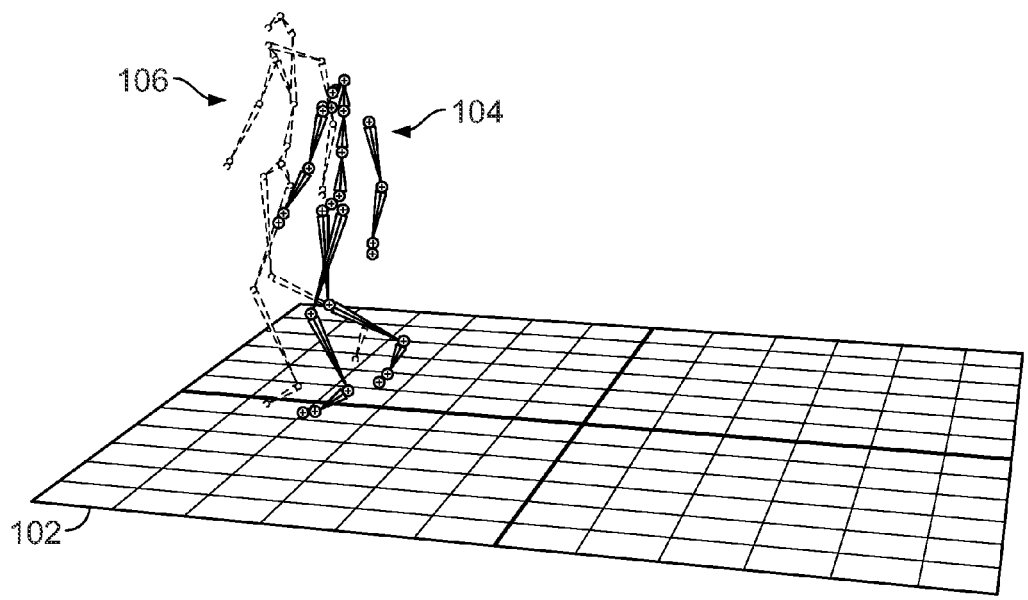

In FIG. 1E, the actor skeleton 104 and the character skeleton 106 continue by taking another step while the root and feet of the character skeleton continue to be scaled to those of the actor skeleton.

Figure 1F:
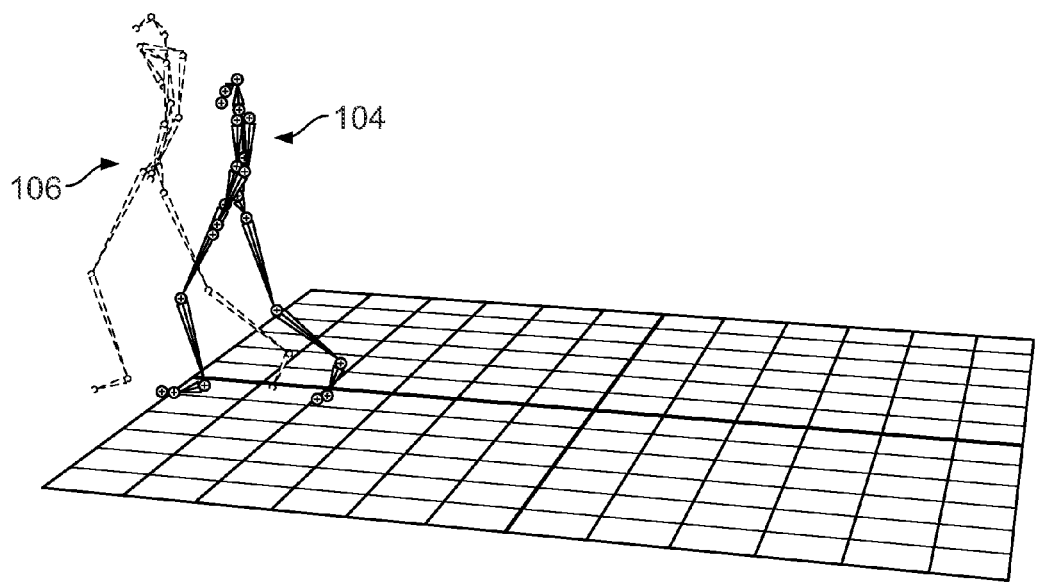

In FIG. 1F, the skeletons are similarly taking another step, and the character skeleton 106 is now a further bit ahead of the actor skeleton 104 compared to earlier figures.

FIGS. 2A-F show example results of retargeting with matching of root and feet positions. That is, in contrast to the previous example, the retargeting is here performed with matching, not scaling, of root and feet positions. Moreover, in the present example the retargeting is performed without constraining the character skeleton to maintain the actor skeleton's pose. A later example will show effects when a maintain pose constraint is applied.

The motion capture information used here is the same as that in FIG. 1. For example, the retargeting is shown in the virtual space 100, the plane 102 has been defined in the virtual space, and the actor skeleton 104 and a character skeleton 106 are created in the virtual space.

Figure 2A:
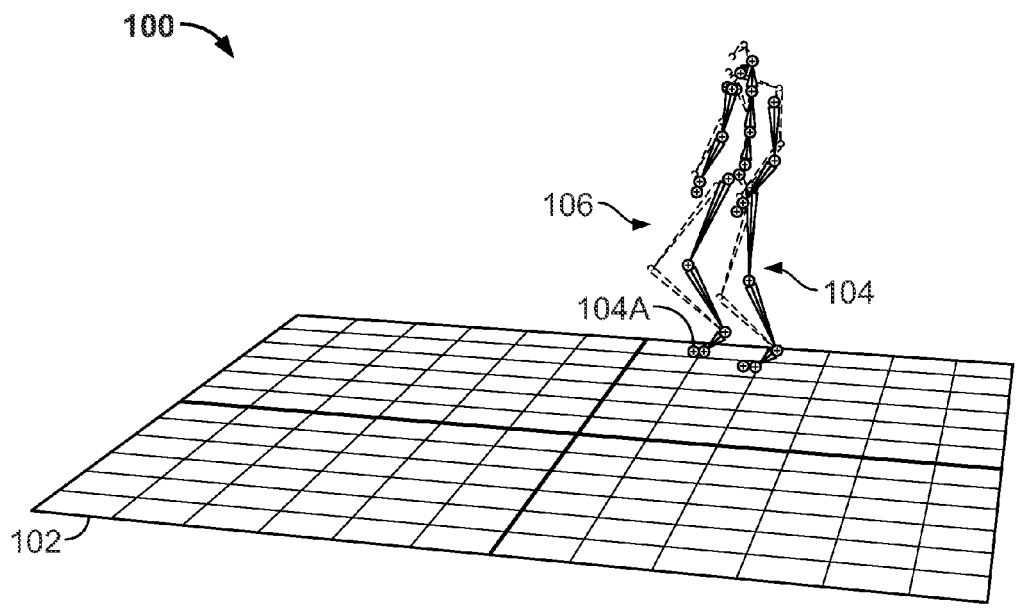
FIGS. 2A-F show example results of retargeting with matching of root and feet positions.
Figure 2B:
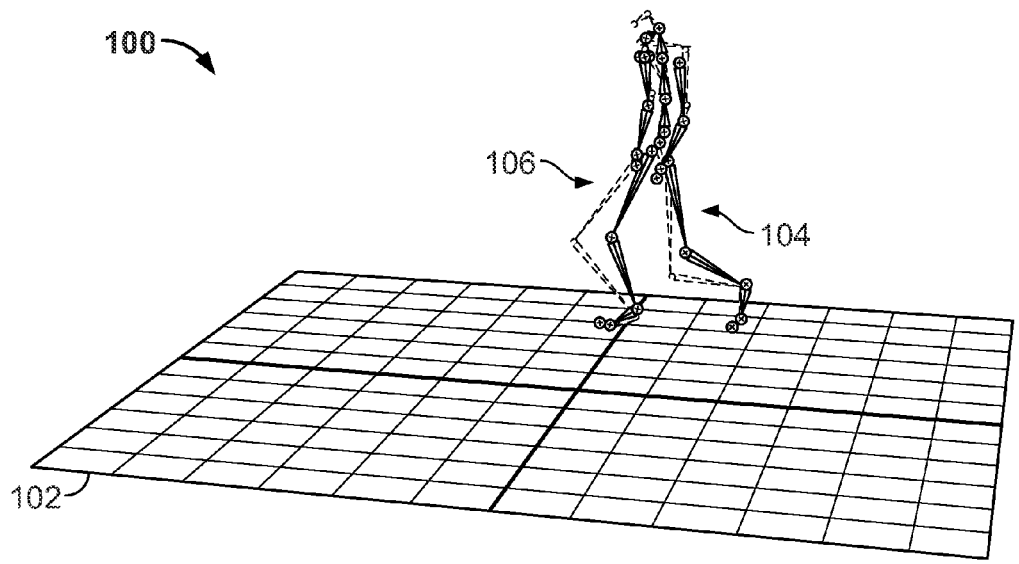
Figure 2C:
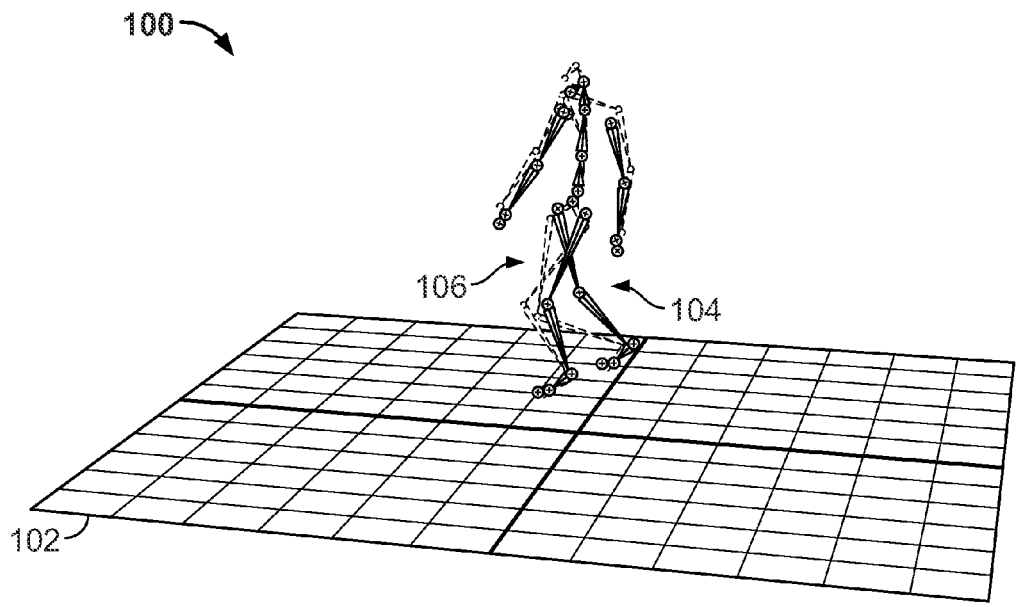
Figure 2D:
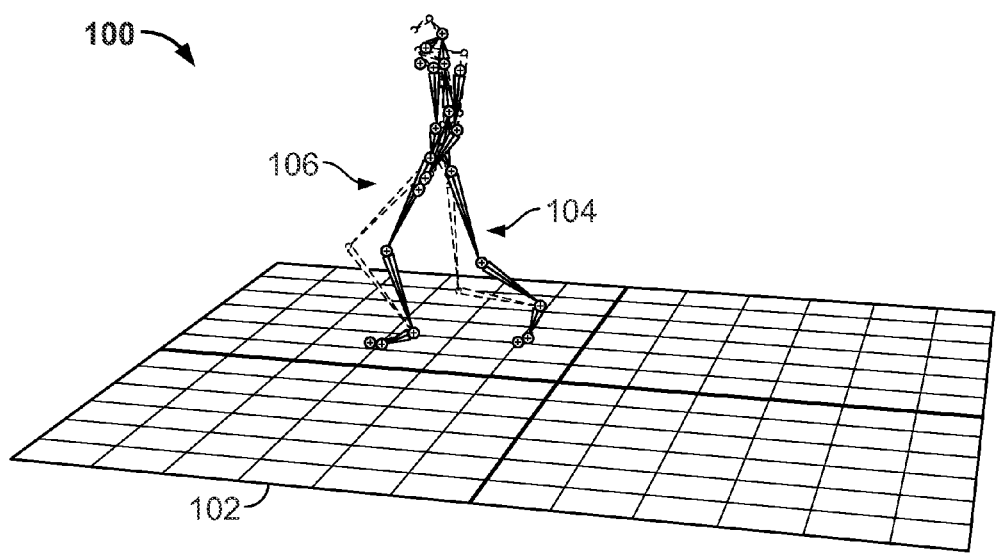
Figure 2E:
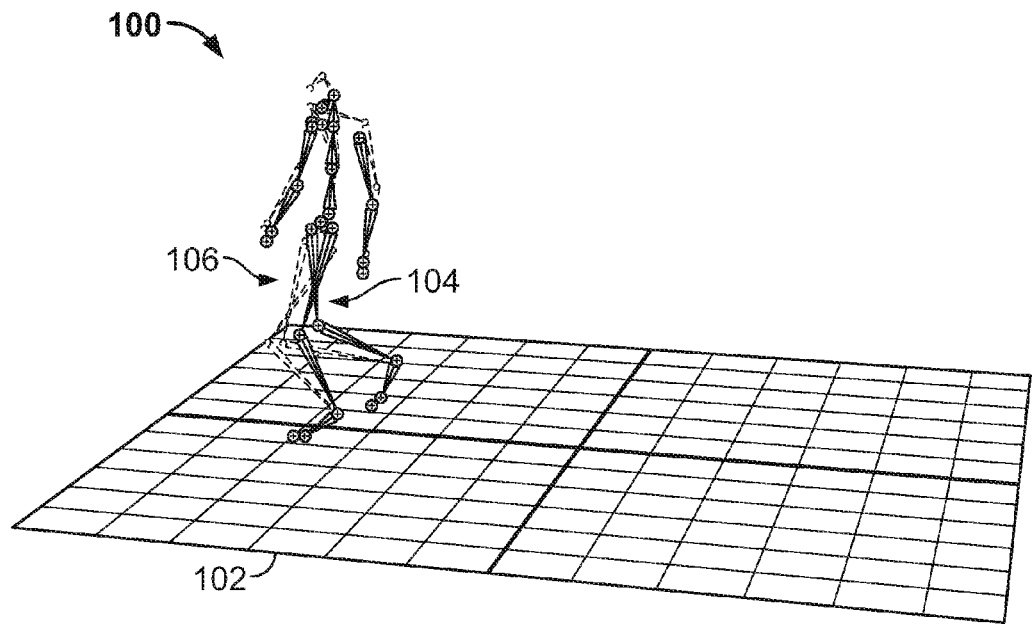
Figure 2F:
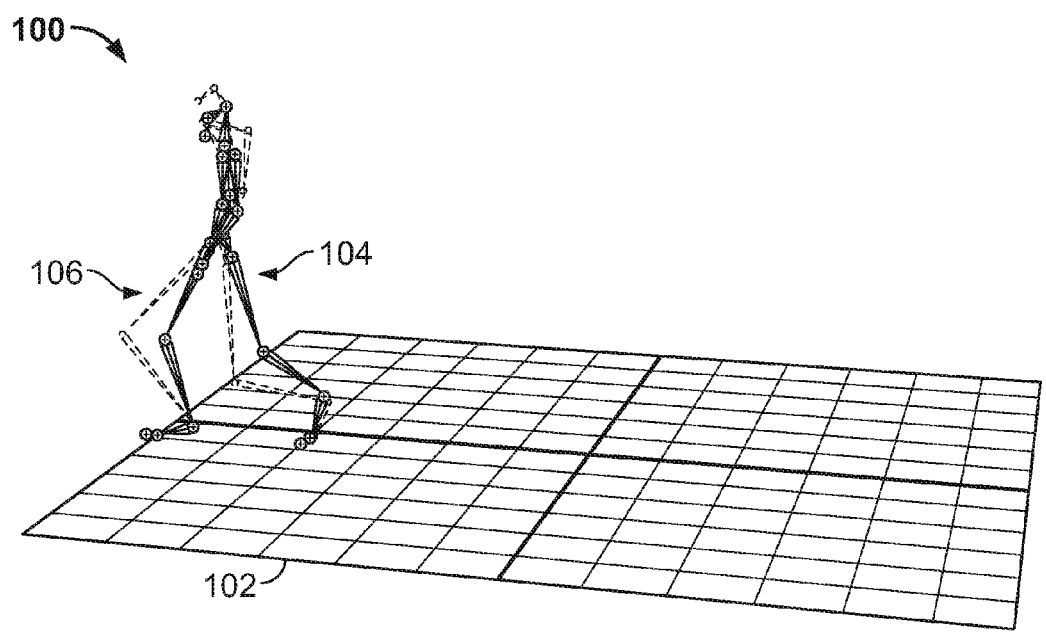

In FIG. 2A, the actor skeleton 104 and the character skeleton 106 are at an initial position, with matching of their respective roots and feet. The illustration shows that the character skeleton 106 has each of its two feet coinciding with a corresponding one of the feet 104A of the actor skeleton 104. While the root for either skeleton is not visualized in these examples, the matching of the roots similarly causes the character skeleton's root to coincide with that of the actor skeleton.

In this example, the character skeleton's legs are longer than those of the actor skeleton. The matching therefore causes the character skeleton's legs to be flexed more (i.e., at a greater angle) than those of the actor skeleton. In other words, the knees protrude more on the character skeleton than on the actor skeleton. This is sometimes referred to as a bent knee effect. In other words, the bent knee effect indicates that the actor skeleton's pose is not maintained by the character skeleton.

In FIGS. 2B-F the skeletons continue walking. In some implementations, the matching of root and feet positions is done as follows. The root of the character skeleton 106 is first matched with the root of the actor skeleton 104, and thereafter the character skeleton is adjusted, if necessary, so that its feet (in this example) match those of the actor skeleton. It is useful in many situations to have the character skeleton's root and feet match those of the actor skeleton in at least part of the sequence to be animated. However, matching the root and feet can cause the bent knee effect.

The bent knee effect here continues to be noticeable throughout the animation due to the matching of the root and feet positions. That is, while the matching ensures that the root of the character skeleton remains in the same position as that of the actor skeleton, and similarly for the feet, the bent knee effect can give the character an unnatural posture. In the next example a constraint is applied to address this effect.

FIGS. 3A-F show example results of applying a maintain pose constraint on the retargeting with matching of root and feet positions. Particularly, in matching the root and feet positions of the actor skeleton 104 in the character skeleton 106, the actor skeleton's pose should also be maintained. That is, similar to the previous example the character skeleton is here animated with matching of the root and feet, but with the difference that a maintain pose constraint is also applied. For example, a user can activate this constraint using a maintain pose control to be described below.

Figure 3A:
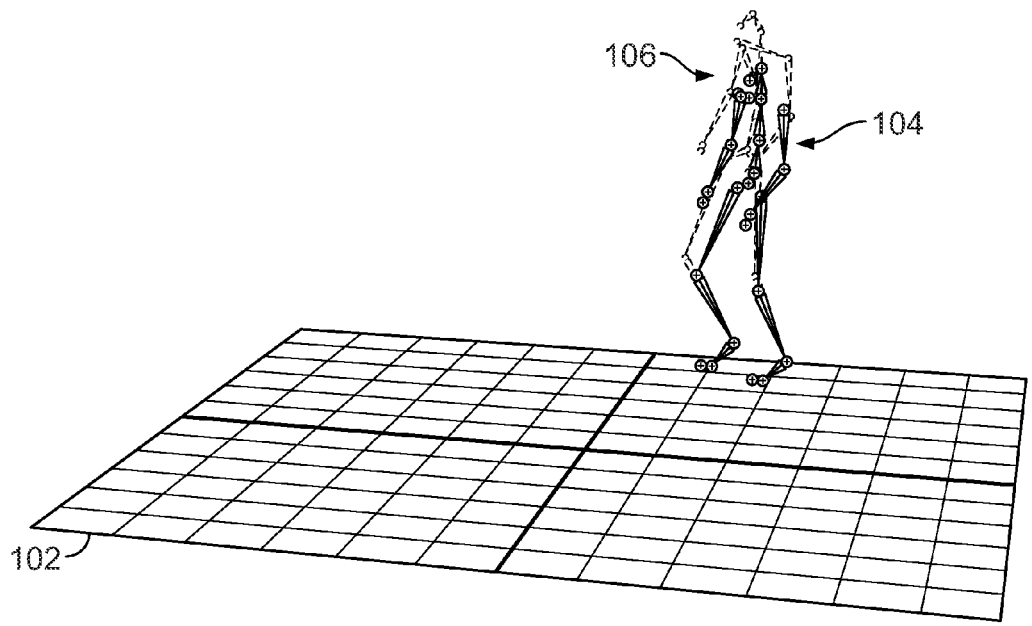
FIGS. 3A-F show example results of applying a maintain pose constraint on the retargeting with matching of root and feet positions.

In FIG. 3A, the actor skeleton 104 and the character skeleton 106 are at an initial position. For example, the respective lower legs of the skeletons essentially coincide due to the maintain pose constraint. Looking at the right upper legs of the two skeletons, moreover, they are parallel to each other due to the constraint but do not coincide, due to the character skeleton's different body proportions. Similar relationships are seen among other parts of the respective skeletons.

Figure 3B:
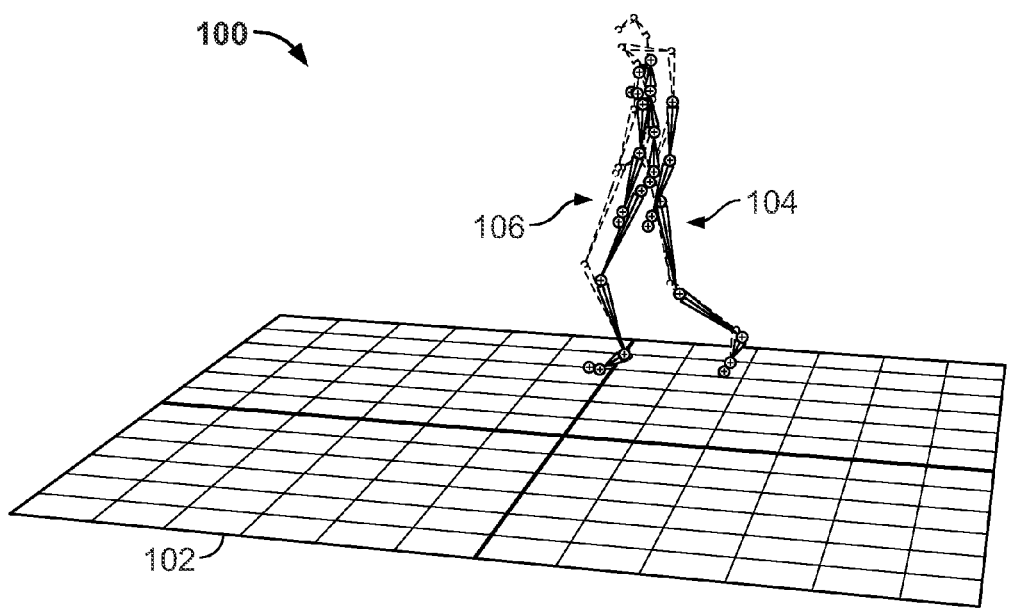
Figure 3C:
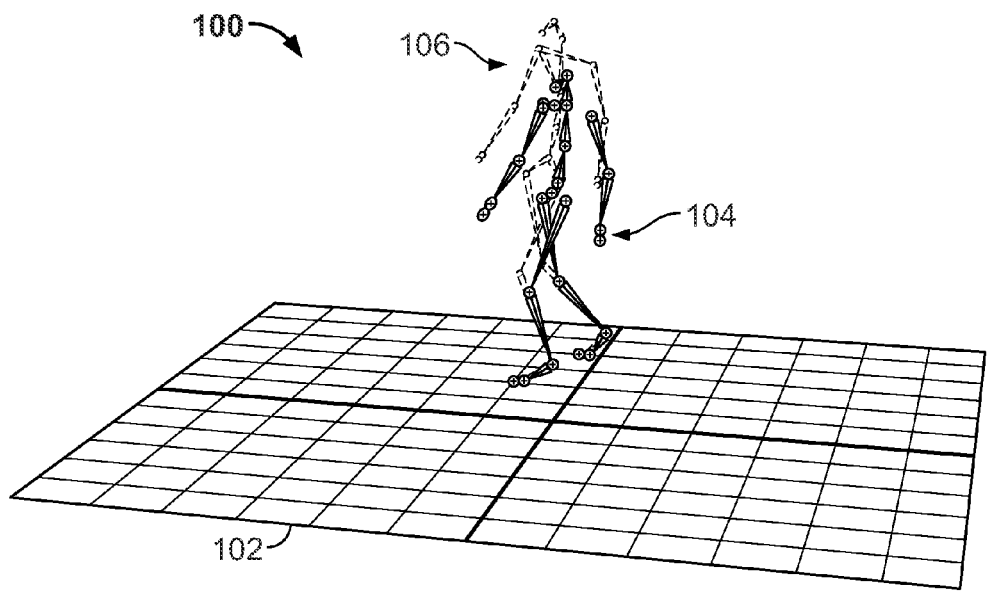
Figure 3D:
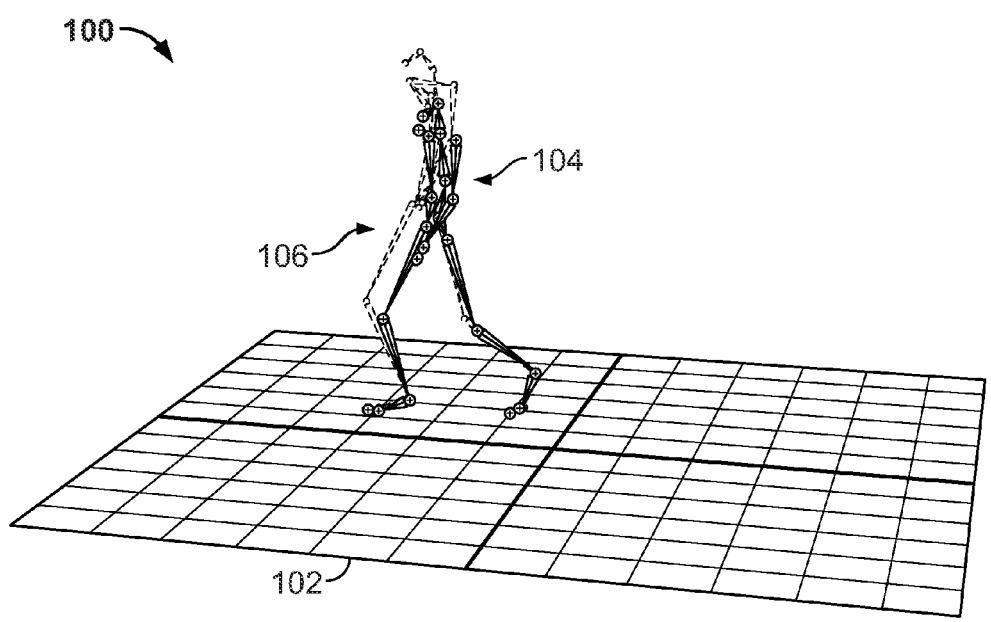
Figure 3E:
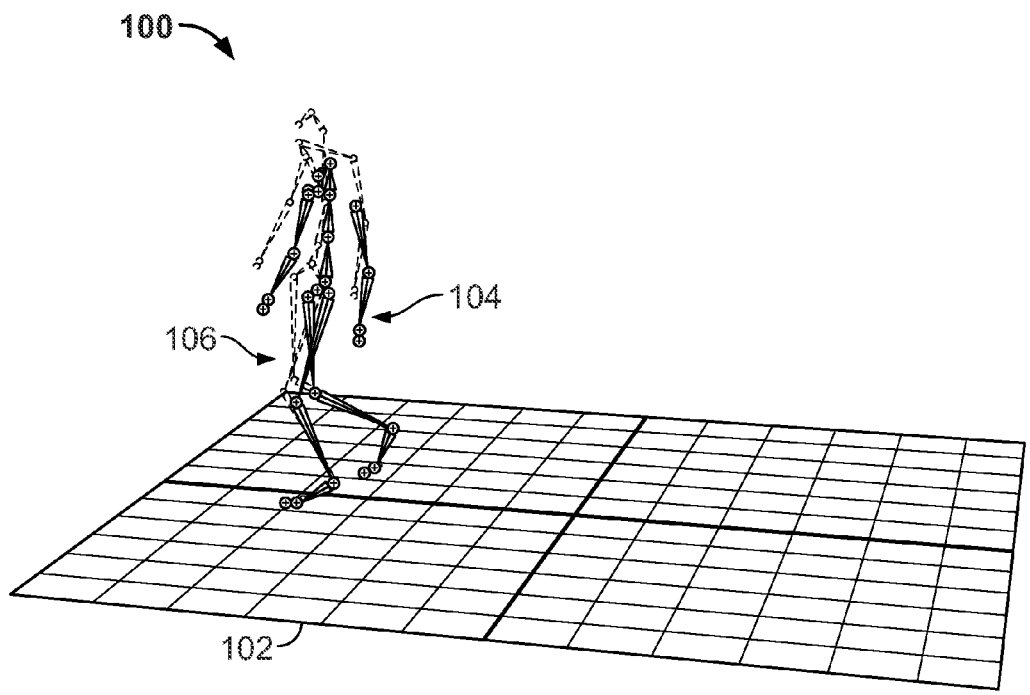
Figure 3F:
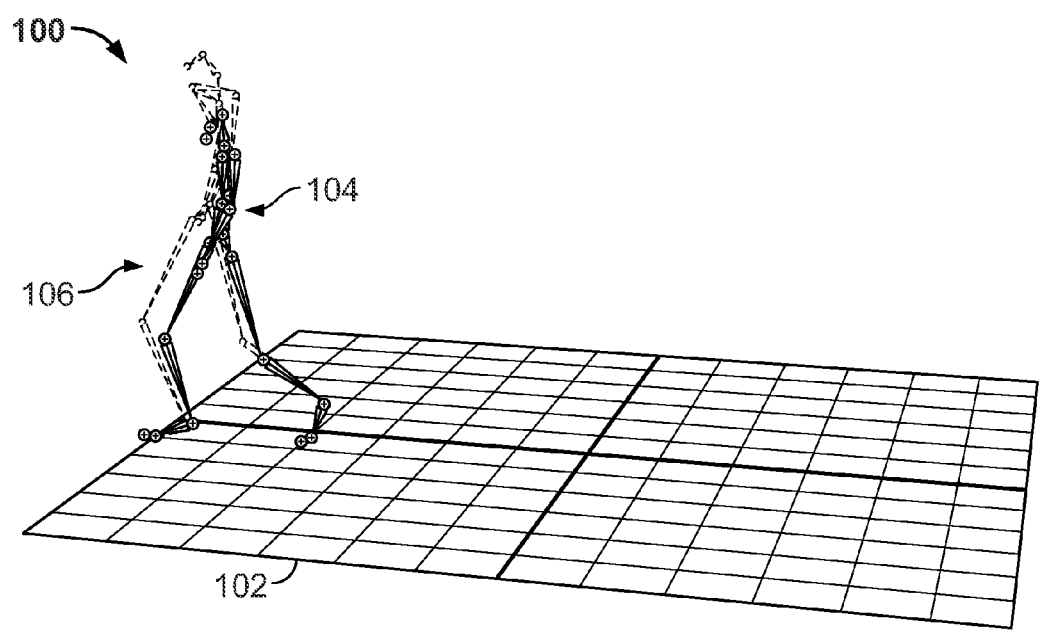

Similarly, in FIG. 3B, as the skeletons are taking their first step, it is seen that the skeletons' respective lower legs continue to essentially coincide due to the maintain pose constraint, while other parts retain their corresponding relationships.

Referring now to FIGS. 3C-F, they illustrate the result of the maintain pose constraint being applied in the further steps taken by the skeletons. It is noticed that the maintained pose gives the character skeleton 106 a more human-like posture and gait-because the motion capture data is from an actor in this example—than does the animation in FIGS. 2A-F, where no maintain pose constraint was applied. Accordingly, the maintain pose constraint is useful in situations where it is desirable that the character skeleton should preserve the general appearance of the actor skeleton.

In the above examples, the same type of action was applied to more than one aspect of the motion capture data (i.e., scaling of both the root and feet, or matching of both the root and feet). More than one type of action can be applied in the retargeting. In some implementations, the available real-time constraint scenarios include "match root and scale feet," which is a combination of scaling and matching. Particularly, the root of the character skeleton is matched to the root of the actor skeleton, but the character skeleton's feet are scaled relative to the character skeleton's root position. In some implementations, this option can eliminate or reduce wobbling which might otherwise occur when the character's legs are not the same length as the actor skeleton's legs. In some situations, the "match root and scale feet" option can make the character skeleton's stride lengths look more correct. However, slipping can occur.

FIGS. 4A-F show example results of retargeting with matching of head positions. More particularly, in a "match head only" real-time constraint scenario the character skeleton's head is matched to the head 104F (e.g., FIG. 1A) of the actor skeleton to track its positions and motions.

In some implementations, every remaining part of the character skeleton (e.g., everything but the head in the character skeleton's joint hierarchy) is then kinematically driven. For example, a number of dedicated solvers are used to calculate new positions for the root, spine, arms and legs of the character skeleton. This can be done based on the matched head position and optionally some other parameter(s), such as intrinsic properties of the character skeleton, the presence or absence of a gravitational force and/or the instant velocity of one or more body parts.

In some implementations, the "match head only" option can be used for purposes of preserving an eyeline between two or more characters. For example, when the actor on the motion capture stage gazes in some direction, it can be ensured that the head of the character skeleton will match the pose of the actor's head. Matching the head only can effectively make the head the root of the character skeleton 106, in the sense that the position and motion of the head will drive the other body parts.

Figure 4A:
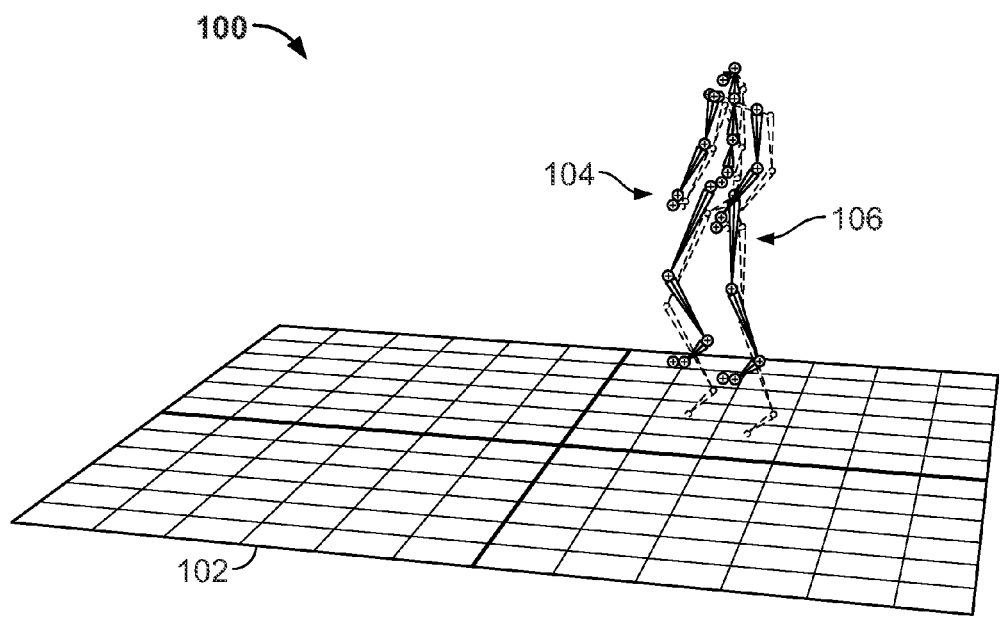
FIGS. 4A-F show example results of retargeting with matching of head positions.

In FIG. 4A, the actor skeleton 104 and the character skeleton 106 are at an initial position. The actor skeleton 104 is here based on the same motion capture data as in previous examples. In this example, however, the heads of the skeletons are currently matched and will continue to be matched throughout the animation. Because the character skeleton is taller than the actor skeleton, this matching causes their respective feet to be at different heights compared to the plane 102. For example, the actor skeleton is here defined so that its feet walk on the plane 102 while the character skeleton's feet, in contrast, extend further down below the plane 102. The feet of the character skeleton are here driven by the motion of the actor skeleton's feet while being located some distance from them vertically. In some situations, there can be a horizontal spacing as well as the vertical one.

Figure 4B:
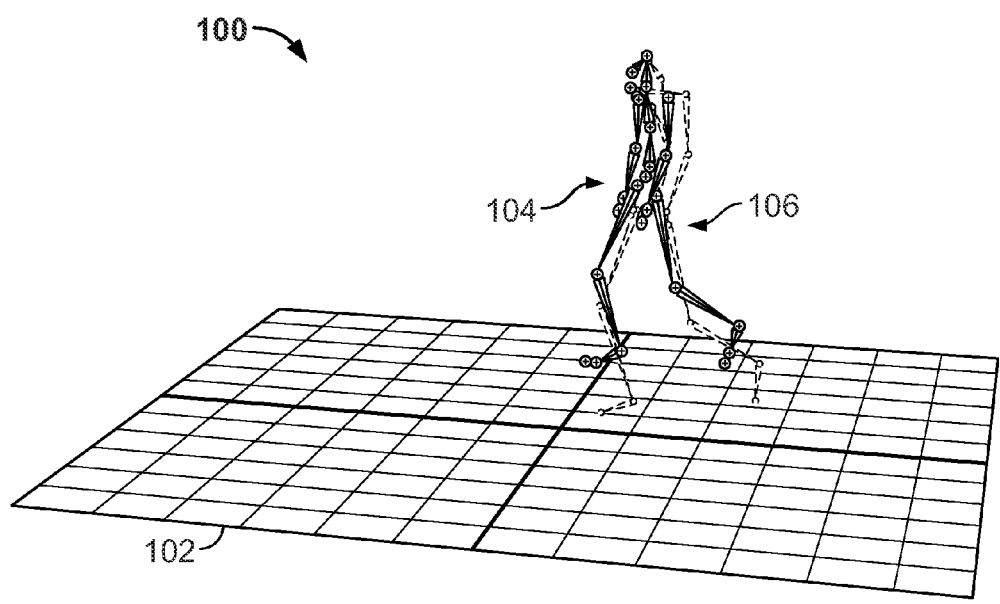

In FIG. 4B, the skeletons have taken a step forward with their right feet. The heads of the respective skeletons are matched to each other. This can be useful, for example, if the scene should show the character's head and upper torso in a close-up shot while the character is walking That is, the actor can then perform the walk in a normal fashion despite that the character skeleton's head and upper torso are normally positioned higher above the ground due to the character's larger body in this example.

Figure 4C:
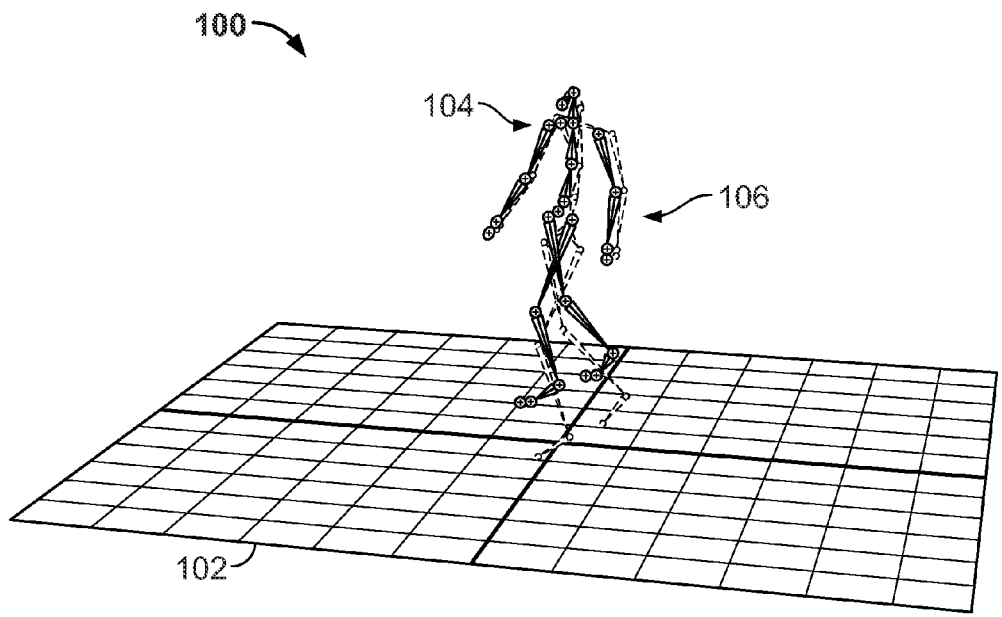

In FIG. 4C, the skeletons have finished the first step and are moving their respective left legs forward in the second step. The angles of the character skeleton's legs are similar to those of the actor skeleton. This is in part due to the fact that the character skeleton's feet are below the plane 102 in this example.

Figure 4D:
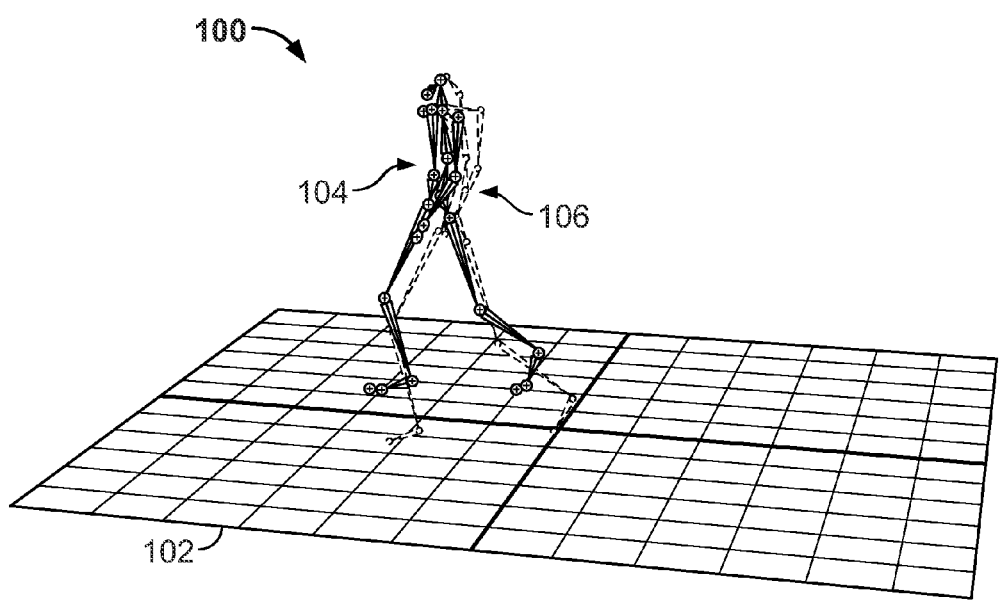
Figure 4E:
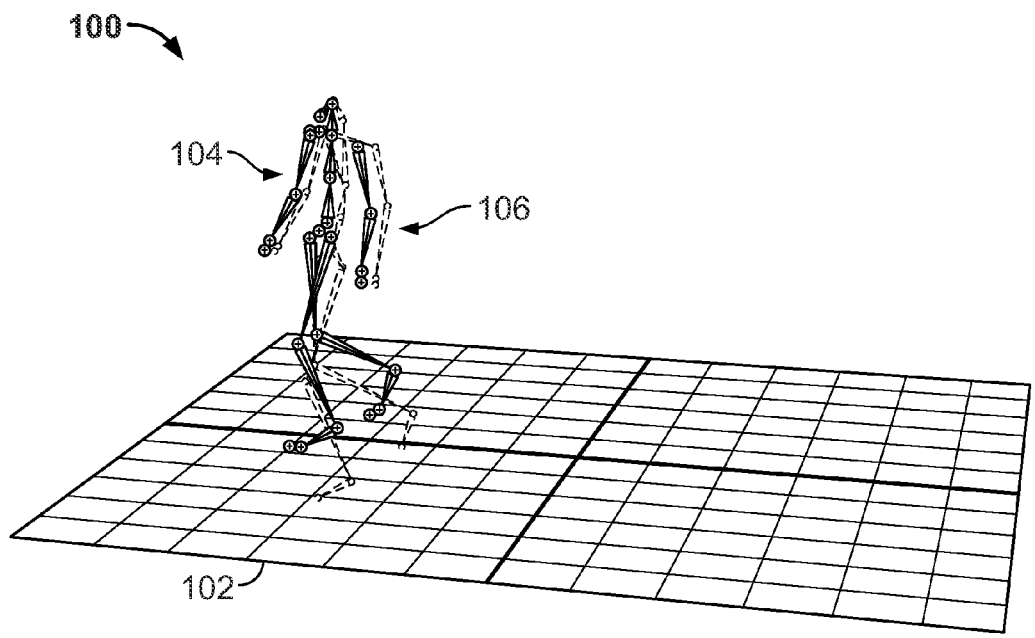
Figure 4F:
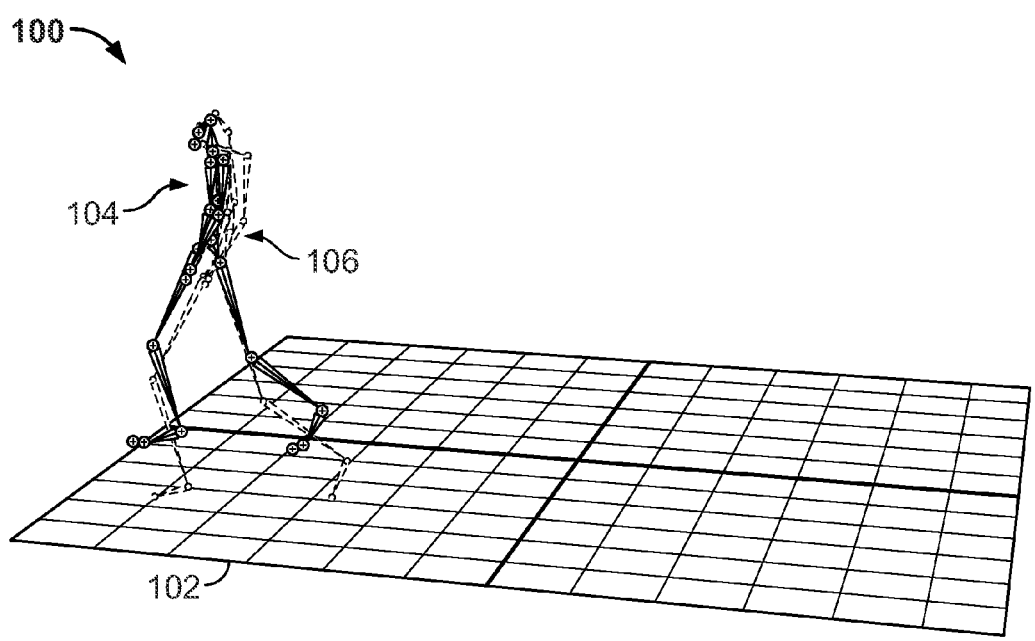

In FIGS. 4D-F, the actor skeleton 104 and the character skeleton 106 are continuing to take steps while their respective head positions are matched. Due to this matching, the character skeleton in this example does not eventually move ahead of the actor skeleton, but rather they walk at the same pace.

The above examples illustrate some real-time constraint scenarios that can be selected and used in some implementations. Other combinations can be used. The following table shows associated actions for the above three real-time constraint scenarios and also for three other real-time constraint scenarios.

| | Real-time constraint scenario | | | | | |
|---|---|---|---|---|---|---|
| Action | "Scale root and feet" | "Match root and feet" | "Match root, scale feet" | "Match head only" | "Match head and feet" | "Match head, scale feet" |
| Scale | | | | | | |
| Root | Y | | | | | |
| Feet | Y | | Y | | | Y |
| Head | | | | | | |
| Match | | | | | | |
| Root | | Y | Y | | | |
| Feet | | Y | | | Y | |
| Head | | | | Y | Y | Y |

For example, the above table shows that in the "match head, scale feet" real-time constraint scenario the feet are the only body parts subject to scaling, and the head is the only body part subject to matching.

Figure 5:
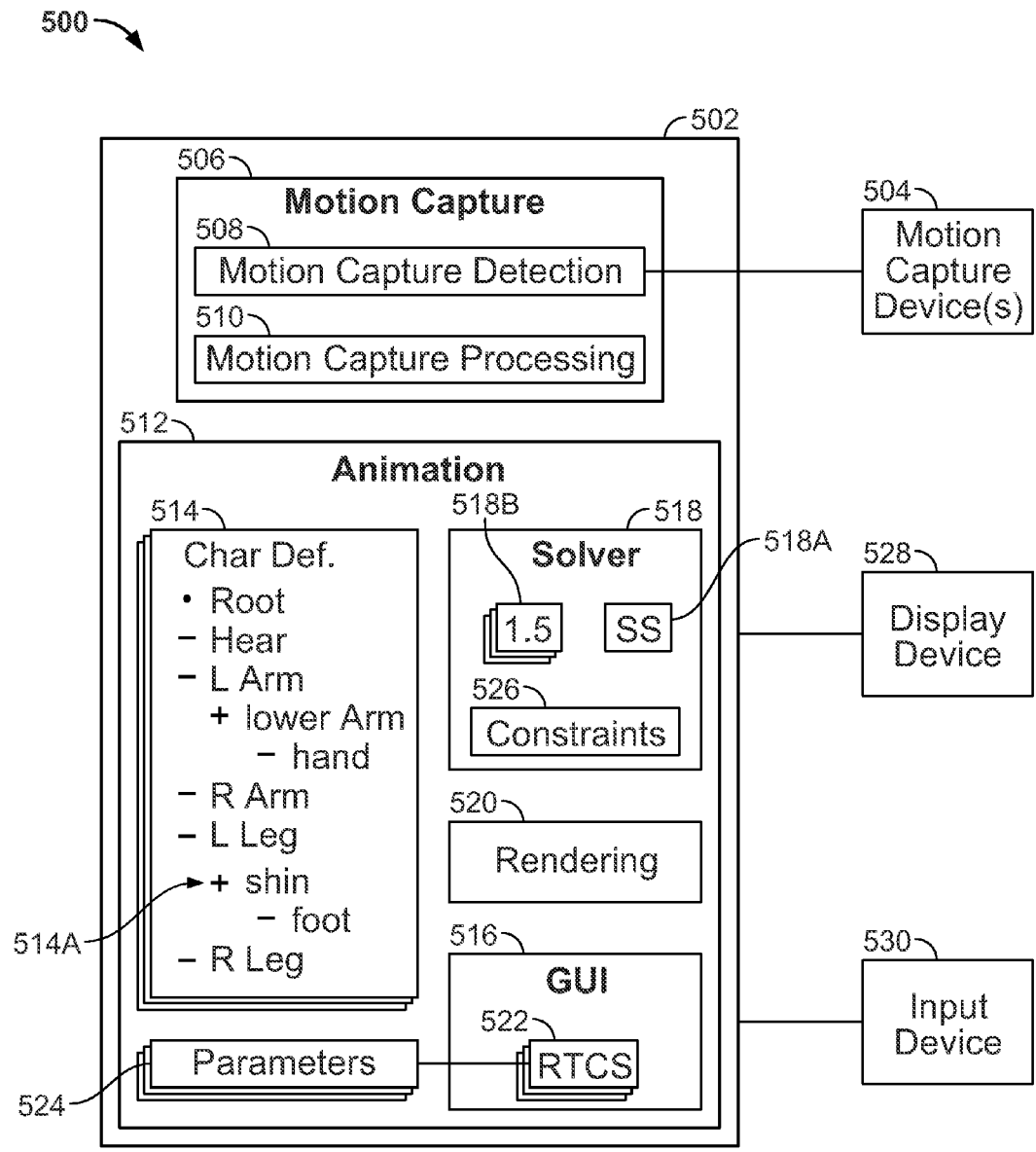
FIG. 5 is a block diagram of an example system that can be used for motion capture and retargeting.

FIG. 5 is a block diagram of an example system 500 that can be used for motion capture and retargeting. For example, the system 500 can be used in performing the operations of one or more of the examples described herein. The system 500 includes a computer system 502. One or more computer based devices can form the computer system 502 including, but not limited to, a server device, a personal computer, a laptop, a handheld device, or a cloud computer system, to name just a few examples. The computer system 502 executes coded instructions (e.g., software) using at least one processor.

The system 500 here includes one or more motion capture devices 504 that are used in capturing motion for generating motion capture data. The motion capture devices 504 are compatible with the motion capture technique(s) to be used in the system 500. The motion capture devices 504 detect movement by one or more actors in any suitable way, including, but not limited to, optically, electromagnetically or acoustically. For example, a number of the motion capture devices 504 can be arranged on, beside and/or above a motion capture stage and for detecting actor motion.

The computer system 502 includes a motion capture component 506 for generating motion capture data and providing it for one or more purposes, such as for animation. In some implementations, the motion capture component 506 initiates the motion capture devices 504 and receives output that they generate, for example in form of analog or digital information. For example, the motion capture component 506 can be implemented as software executed on one or more physical machines.

The motion capture component 506 includes a motion capture detection component 508 that detects and registers the output received from the motion capture devices 504. The motion capture component 506 also includes a motion capture processing component 510 that receives one or more signals from the motion capture detection component 508 and processes the signal(s) to generate motion capture data in a form that is suitable for the computer system 502, for example as numerical information.

The computer system 502 here includes an animation system 512 which can be used for generating animations based on motion capture data or other information. For example, the animation system 512 can be implemented as software executed on one or more physical machines. The animation system 512 here includes one or more character definitions 514, a graphical user interface (GUI) component 516, real-time constraint scenarios 518, a solver component 518 and a rendering component 520.

Each of the character definitions 514 defines at least one character that can be animated in one or more ways and shown in a video sequence or a still image. For example, each of the skeletons 104 and 106 (e.g., FIG. 1A) can be based on a separate one of the character definitions 514. In some implementations, the character definition 514 constitutes or includes a joint hierarchy 514A. Here, the joint hierarchy 514A includes separate components for the respective root, head, upper and lower arms, hands, etc., of the defined character, and these components are hierarchically organized according to their role in forming the character. For example, the head component can be defined immediately below the root in the hierarchy, meaning that the root affects how the head moves. Similarly, one or more components can be subject to another component, for example such that the hand component depends on the lower arm component, which in turn depends on an upper arm component.

The GUI component 516 presents one or more aspects of the motion capture data and/or the generated animation(s). For example, the GUI component 516 can display the virtual space 100 (e.g., FIG. 1A), and one or more objects therein, to a user.

The solver component 518 is used for calculating one or more aspects regarding the character(s) being driven by motion capture data. In some implementations, the solver component 518 includes a stance solver 518A, sometimes referred to as a root solver, and one or more limb solver 518B, such as one per limb of the character. As an example, a solver can perform an optimization algorithm that seeks to fit the character skeleton's degrees of freedom so that the constraints are satisfied as much as possible.

For example, in the above example regarding "match head only," the character's head position is driven by the actor's head. Therefore, when this real-time constraint scenario is selected, the head solver among the limb solvers 518B remains deactivated (or is explicitly deactivated, as the case may be). In contrast, all others of the limb solvers 518B, and the stance solver 518A, are activated (unless already active). The result is that the activated limb solvers determine a certain position, orientation, etc., for each respective limb. This determination ultimately depends on the head position, which is defined by constraint and not calculated by a solver. With some limbs, the solver determination may primarily depend on one or more other limbs, for example the hand which is driven by the lower arm.

Multiple real-time constraint scenarios 522 are schematically illustrated in the animation system 512. In some implementations, the real-time constraint scenarios 522 include some or all of the examples shown in the table above. For example, the GUI component 516 can display one or more of the real-time constraint scenarios 522 as an option that the user can select to affect the retargeting in a certain way.

Each of the real-time constraint scenarios 522 is associated with one or more parameters 524, as conceptually illustrated here. The parameters 524 represent the settings that should be applied to the solver component 518 according to the user's selection. Applying the selected parameters effectively imposes one or more constraints 526 on the solver calculations for the current retargeting. For example, in "match head only" the constraint 526 causes the character skeleton's head to track that of the actor skeleton. Similarly, in "match root, scale feet" the constraint 526 causes the character skeleton's feet to assume a position scaled from the root when being driven by the actor skeleton's feet.

Regarding joint angles, as a specific example, they can either be calculated by one or more of the limb solvers 518B or obtained directly from the motion capture information. That is, based on the selected real-time constraint scenario one or more of the limb solvers is activated which determines at least one joint angle for a corresponding character limb. For any character limb where the corresponding limb solver is not activated, a corresponding joint angle is registered from the motion capture information as set as a second joint angle. The pose of the character skeleton is defined when all joint angles have been handled in either of these ways.

The following is an example of operations performed in the system 500. When the actor is performing on the motion capture stage, the positions and movements are captured by the respective motion capture devices 504. From there, an output is provided to the motion capture detection component 508 and further on as a signal to the motion capture processing component 510, where it is converted to motion capture data. In some implementations, one or more of these operations can be performed in another system or device, for example by the motion capture devices 504.

The GUI component 516 presents some or all of the real-time constraint scenarios 522 on a display device 528. In some implementations, one or more character objects are also shown. Using one or more input devices 530, such as a keyboard, pointing device or touch sensitive device, the user selects one of the real-time constraint scenarios 522 for use in the retargeting. The animation system 512 provides the parameters 524 corresponding to the user's selection to the solver component 518, effectively defining one or more of the constraints 516 as currently being applicable. Based on the parameters 524 and/or the constraints 526, the animation system ensures that the proper one or more of the stance solver 518A and the limb solvers 518B are currently activated, and that another one or more of the solvers is currently deactivated.

For at least one character limb where the corresponding limb solver is not activated, a corresponding joint angle from the motion capture information is registered as a second joint angle. The solver component 518 determines one or more joint angles for the character skeleton using the activated one(s) of the limb solvers 518B and the stance solver 518A. The registered and/or calculated joint angles are applied to the character skeleton. The rendering component 520 can render the resulting character object onto a sequence of images that are then presented on the display device 528.

Figure 6:
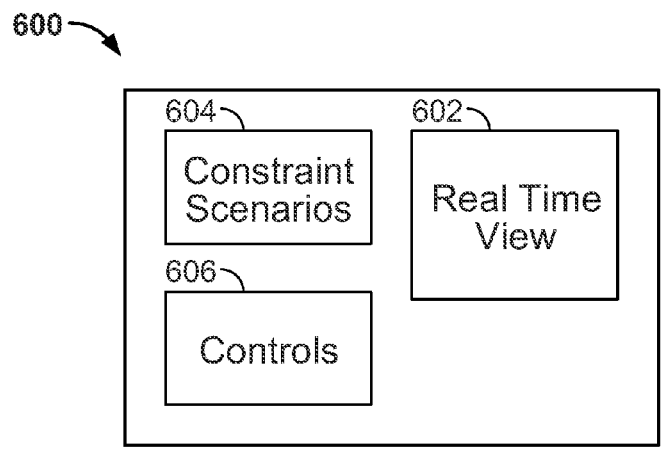
FIG. 6 schematically shows an example graphical user interface (GUI) that can be used for motion capture and retargeting.

FIG. 6 schematically shows an example graphical user interface (GUI) 600 that can be used for motion capture and retargeting. In some implementations, the GUI 600 can be used with any system or technique described herein, for example the system 100. The GUI 600 here includes a first area 602, a second area 604 and a third area 606. The first area 602 is configured for presenting a real-time view of a character driven by motion capture information from an actor. For example, the virtual space 100 (e.g., FIG. 1A) with at least the character skeleton 106 (FIG. 1A) can be shown in the area 602.

The second area 604 is configured for a user to choose any of multiple real-time constraint scenarios. Any of the real-time constraint scenarios described herein can be chosen, to name just some examples.

The third area 606 is configured for the user to specify a location for a part of the character, wherein the character is adjusted so that the part of the character is at the specified location. For example, the area 606 can be used for ensuring that the hand (or other extremity) of the character skeleton 106 (e.g., FIG. 1A) will remain fixed to a certain object, such as to the shoulder of another character. That is, while motion capture data is being generated and applied the hand remains constrained to its defined position.

Figure 7:
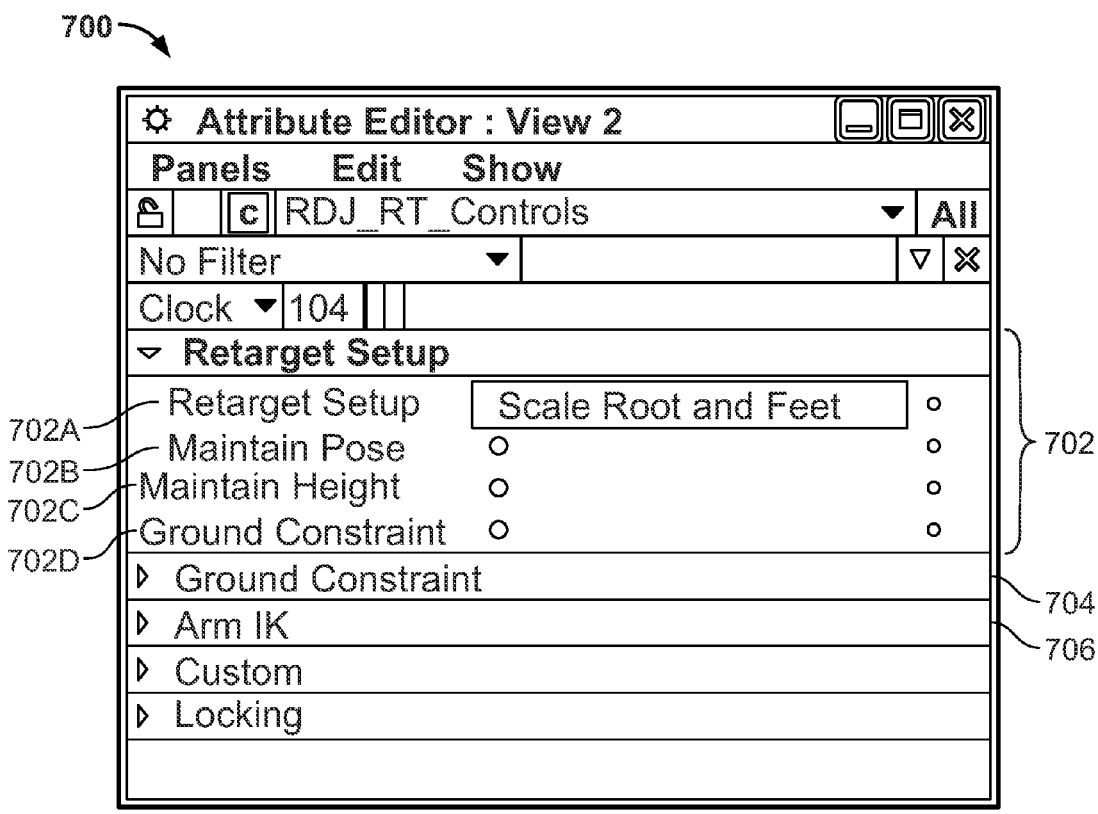
FIGS. 7-8 show examples of features that can be included in a GUI.
Figure 8:
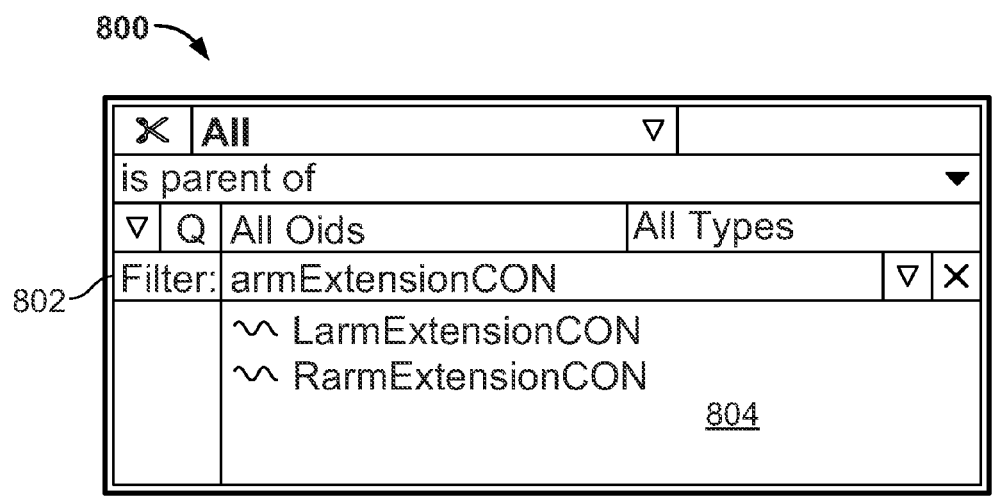

FIGS. 7-8 show examples of features that can be included in a GUI 700. For example, some or all of the features can be included in the GUI 600 (FIG. 6) and/or in the GUI component 516 (FIG. 5).

FIG. 7 shows an attribute editor 700 that presents a choice between real-time constraint scenarios. For example, the attribute editor 700 can be included in the second area 604 (FIG. 6).

The attribute editor 700 includes a retarget setup area 702 where the user chooses between two or more real-time constraint scenarios. Particularly, the area 702 includes a retarget setup control 702A that can identify or otherwise indicate one or more real-time constraint scenarios at a time. Here, "Scale root and feet" is currently listed, and one or more other real-time constraint scenarios will be visible after expansion.

The area 702 includes a maintain pose control 702B that applies joint angles of the actor to the character. In some implementations, the root position of the character is automatically computed and adjusted from an initial matching position so that the character's joints assume the same pose and stance as the actor, as closely as possible. For example, activating the maintain pose control 702B while "Match root and feet" is selected in the retarget setup control 702A makes the character skeleton stand up more properly than otherwise under this constraint. That is, while the feet remain constrained, the solver is allowed to adjust the root so that the actor's pose is maintained.

The area 702 includes a maintain height control 702C where the character's height relative to the actor is preserved. If the character is normally taller than the actor in the rest pose, it will stand taller during motion as well.

The area 702 includes a ground constraint control 702D. For example, when the ground constraint is activated using the control 702D, the "foot plants" of the actor are detected, and at these moments the feet of the character are constrained to be on the plane 102 (e.g., FIG. 1A), such as a ground mesh. If the ground is moved up and down, the character will move with it, but keep the same stance.

The attribute editor 700 includes a ground constraint area 704 that can be used for specifying details about the ground constraint.

The attribute editor 700 includes an arm inverse kinematics (IK) control 706 that regulates a match between the actor's hands and the character's hands. For example, a particular setting of this weight (e.g., the value 1.0) causes the character's hand to track the actor's hand as closely as possible. In contrast, a different setting (e.g., less than 1.0) gives the actor's hand less impact in controlling the character's hand. In some implementations, settings of the control 706 are animated. For example, this allows the user to blend the reach that the character is experiencing between on and off.

In short, the attribute editor 700 provides the user with the ability to choose between multiple real-time constraint scenarios and the GUI can show the effect of the newly selected real-time constraint scenario in real time; that is, applied to motion capture data and rendered into images. For example, this allows the user to experiment with different constraints while motion capture is ongoing.

FIG. 8 shows a control panel 800 that regulates one or more aspects of a character that is driven by motion capture data. In some implementations, the control panel 800 is available after the user activates the arm IK control 706 (FIG. 7). For example, the control panel provides access to controls that can override the results of other components, such as solvers.

The control panel 800 includes a filter control 802 that can be used to narrow or expand the scope of controls that are currently available. In some implementations, the filter control 802 corresponds to the joint hierarchy of the character object that is being driven by the motion capture data. Here, the user has focused on controls regarding arm extension, as indicated in an area 804. Particularly, the user here has the opportunity to control the target of the character's arm using the corresponding control in the area 804. For example, in a scene where a separate item is handed to or from the motion capture driven character, it is important that the character's hand be in the same position as the actor's hand at the handoff moment. To ensure this, the arm's target is defined using the control in the area 804 (i.e., LarmExtensionCOM or Rarm ExtensionCOM), and this overrides the target position that would otherwise have resulted from solver calculation, etc. In some implementations, the control is defined as a child of the elbow joint, so the control can be translated independently of the hand. That is, the control need not be in the same exact position as the child joint that it affects. For example, the control can be moved in or out along the bone axis but affects the parent joint rotation consistently.

A similar effect can in some implementations be obtained by instead using another control that relates to the character's hand (called handCON_AdjCON), with the difference that it will rotate with the actor's hand.

Figure 9A:
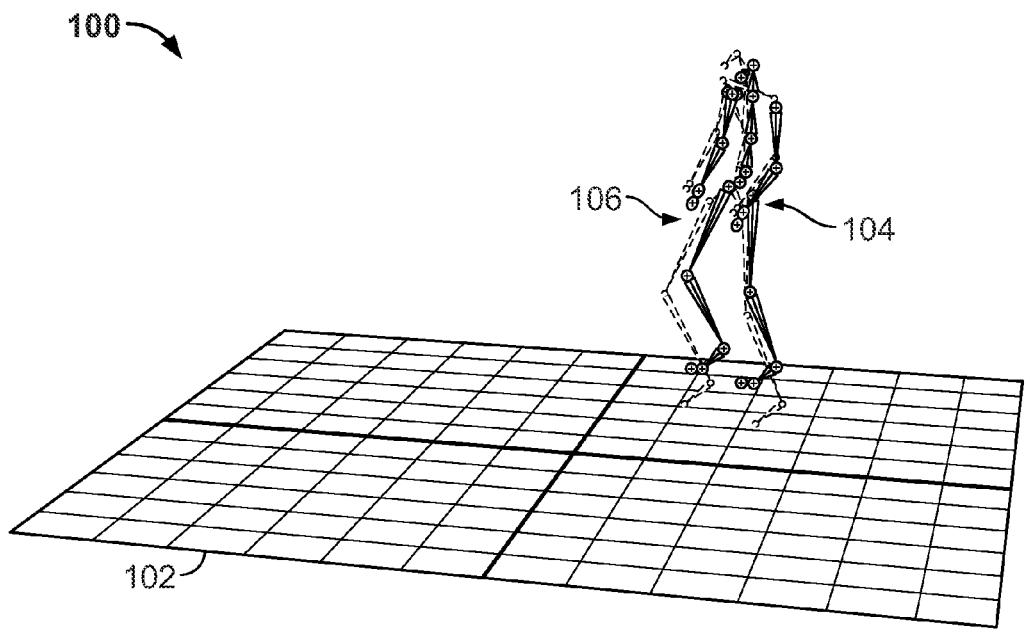
FIGS. 9A-F show example results of retargeting with matching of root positions and scaling of feet positions.

FIGS. 9A-F show example results of retargeting with matching of root positions and scaling of feet positions. In FIG. 9A, for example, it is seen that the respective parts of the two skeletons are essentially parallel even though they do not coincide with each other. However, while the actor skeleton 104 is defined so that its feet walk on top of the plane 102, the feet of the character skeleton 106 in this example extend down below the plane 102 (similar to the example shown in FIGS. 4A-F).

Figure 9B:
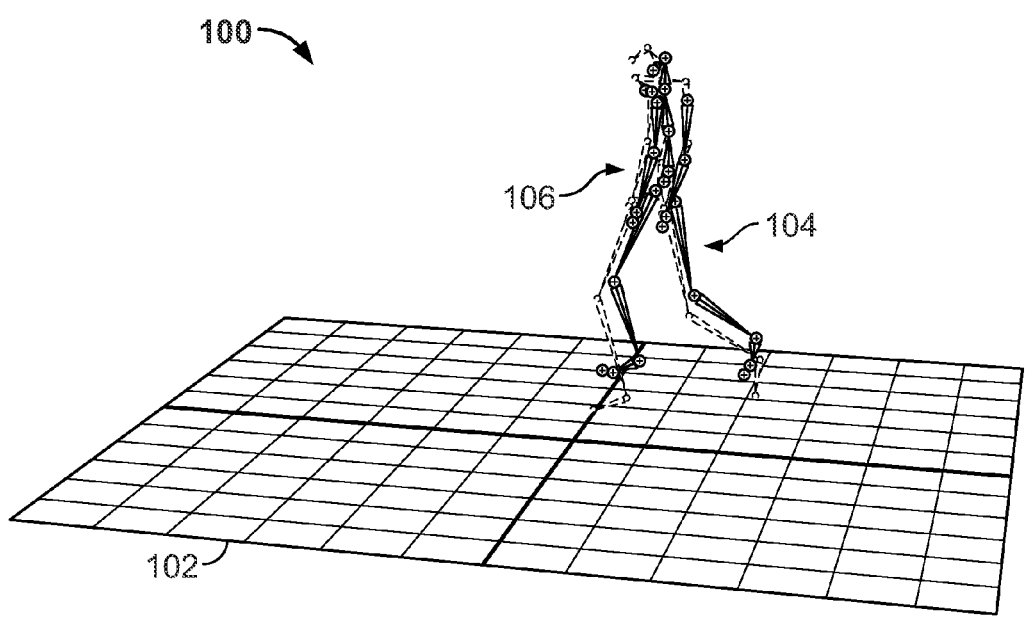
Figure 9C:
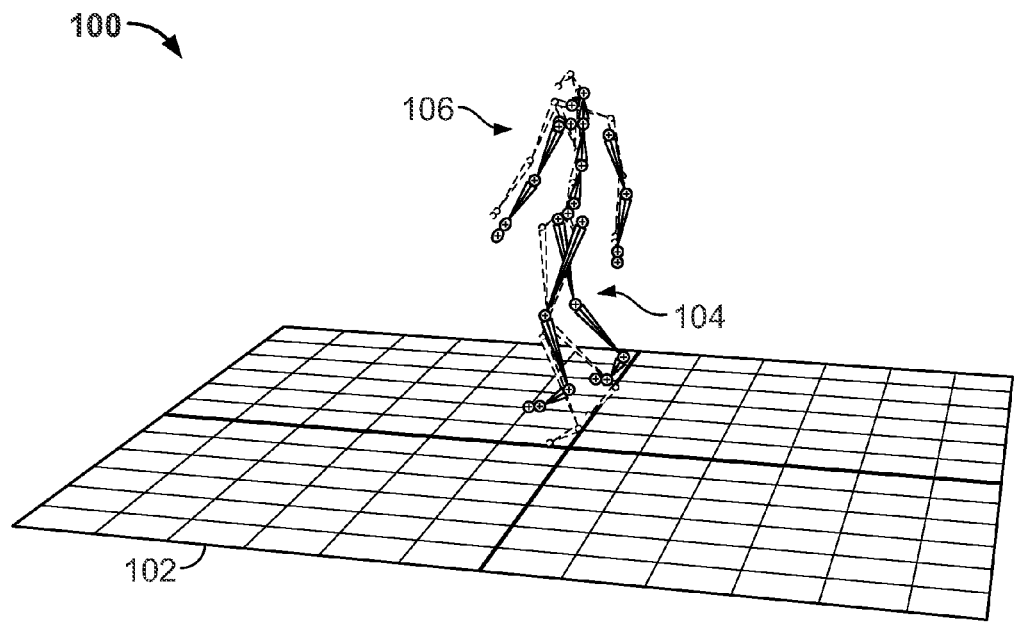
Figure 9D:
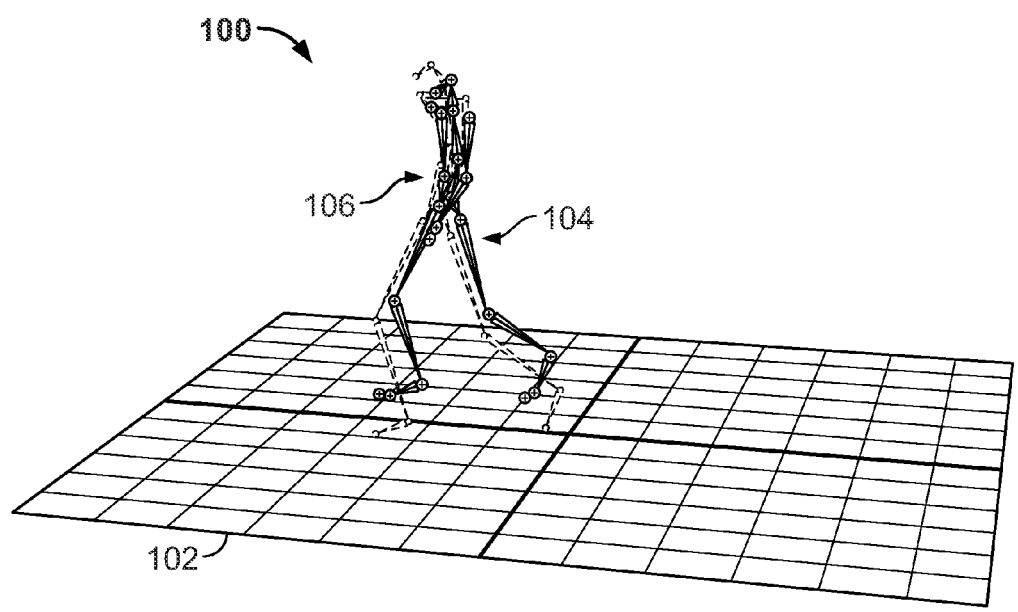
Figure 9E:
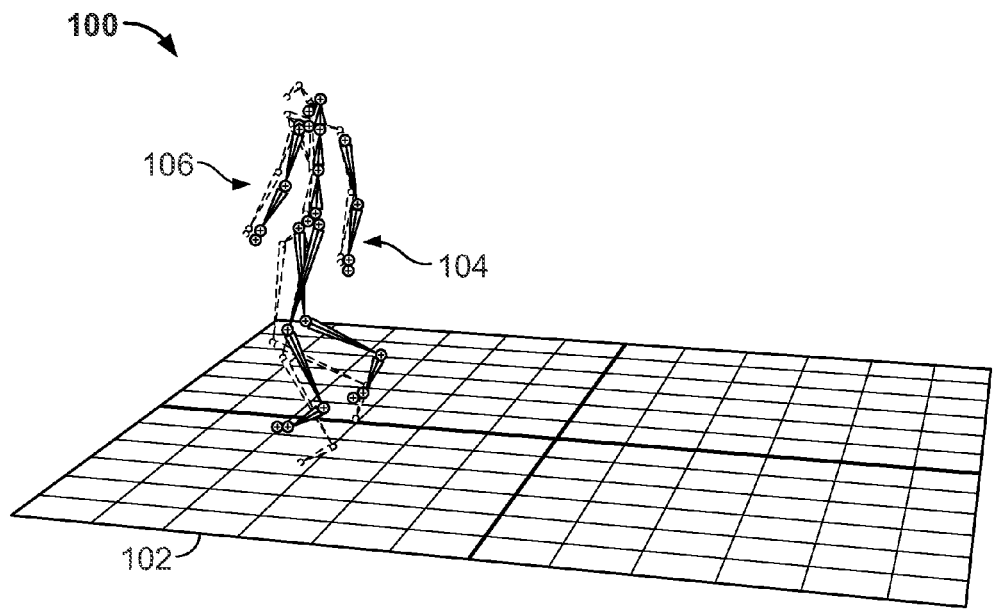
Figure 9F:
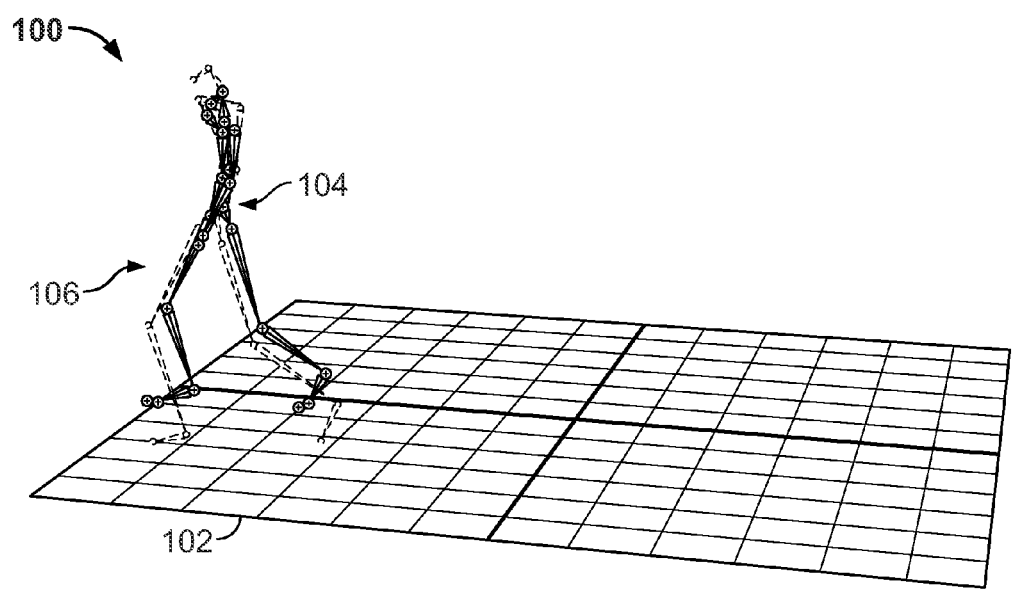

Continuing with FIG. 9B, the skeletons have now taken their first respective step and their root positions are matched, while their feet positions are scaled. The character skeleton 1004B here appears to have a human-like posture, except that its feet extend down below the plane 1002. Similarly, this effect continues to appear in FIGS. 9C-F as the skeletons continue to take more steps. Note, for example, that the left leg of the character skeleton 1004B is bent to a lesser degree than the left leg of the actor skeleton. This is another result caused by the matching of the root and the scaling of the feet. Nevertheless, despite that the character skeleton walks at a lower level than the plane 1002, its posture and movement are plausible for its proportions. In the next example a constraint is applied to address the difference in the ground level.

FIGS. 10A-F show example results of applying a ground constraint on the results in FIGS. 9A-F. That is, the character skeleton 1004B is here constrained so that despite the matching of the root and the scaling of the feet, the character skeleton's feet are constrained to not pass below the plane 1002. That is, the plane 1002 is defined as the ground on which the character skeleton should walk. For example, this can be done in response to a user activating the ground constraint control 702D (FIG. 7).

Figure 10A:
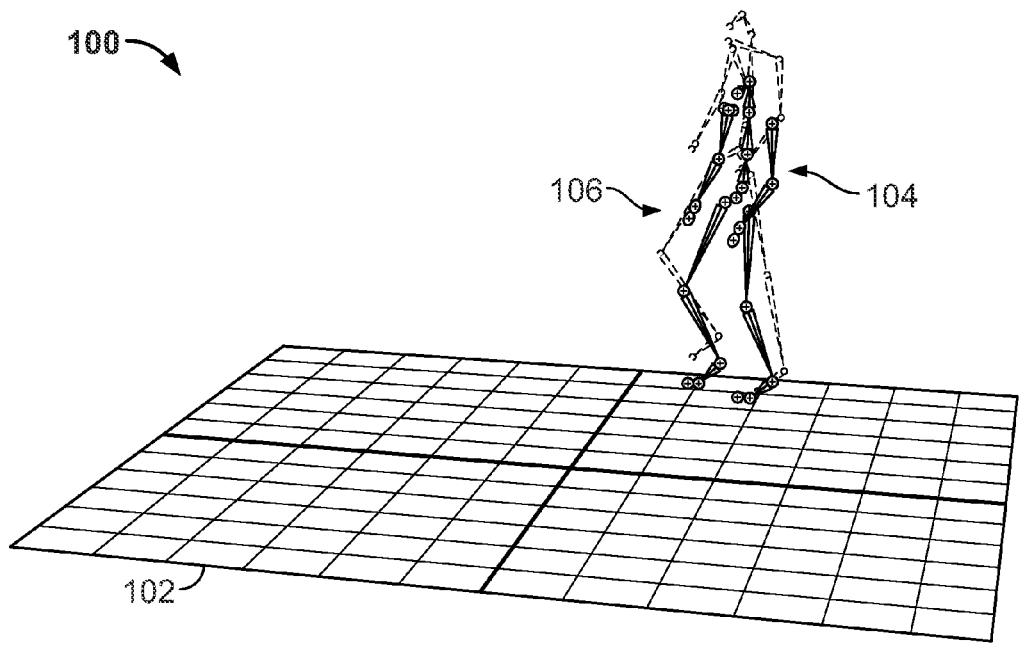
FIGS. 10A-F show example results of applying a ground constraint on the results in FIGS. 9A-F.
Figure 10B:
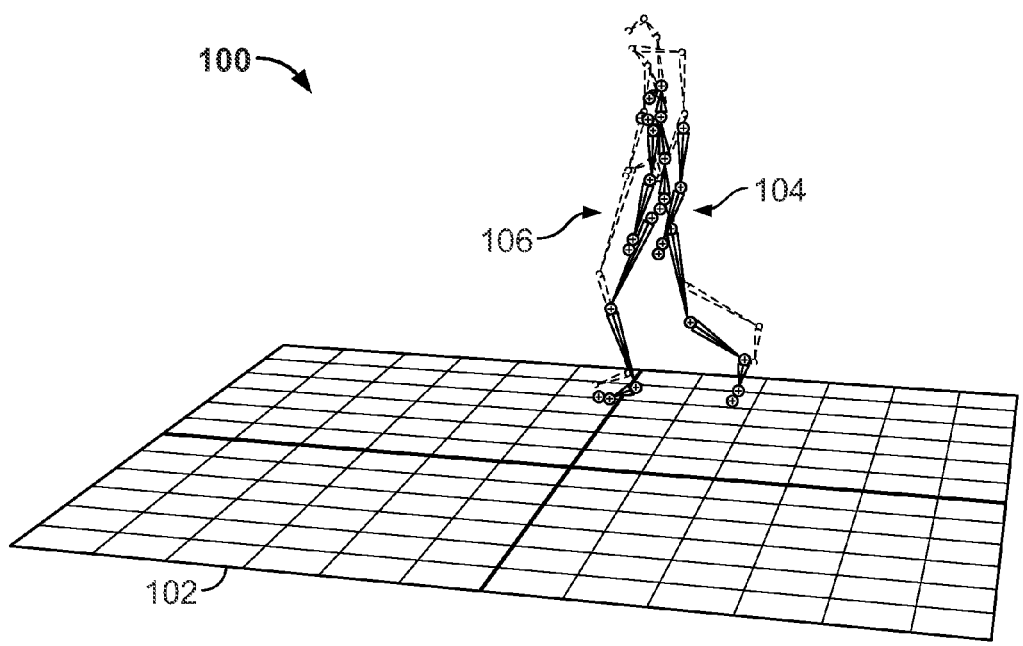
Figure 10C:
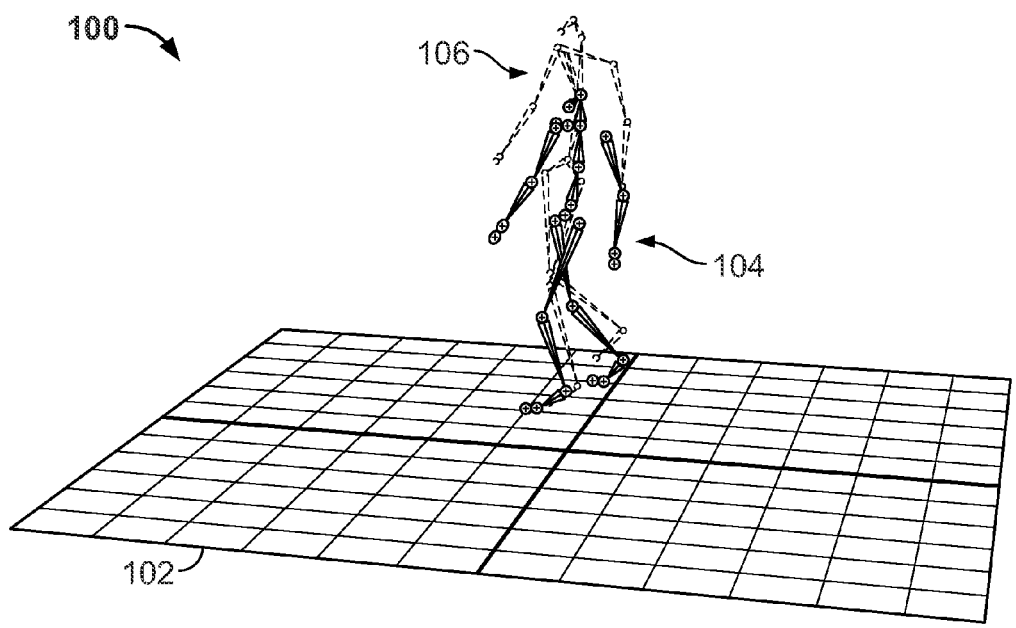
Figure 10D:
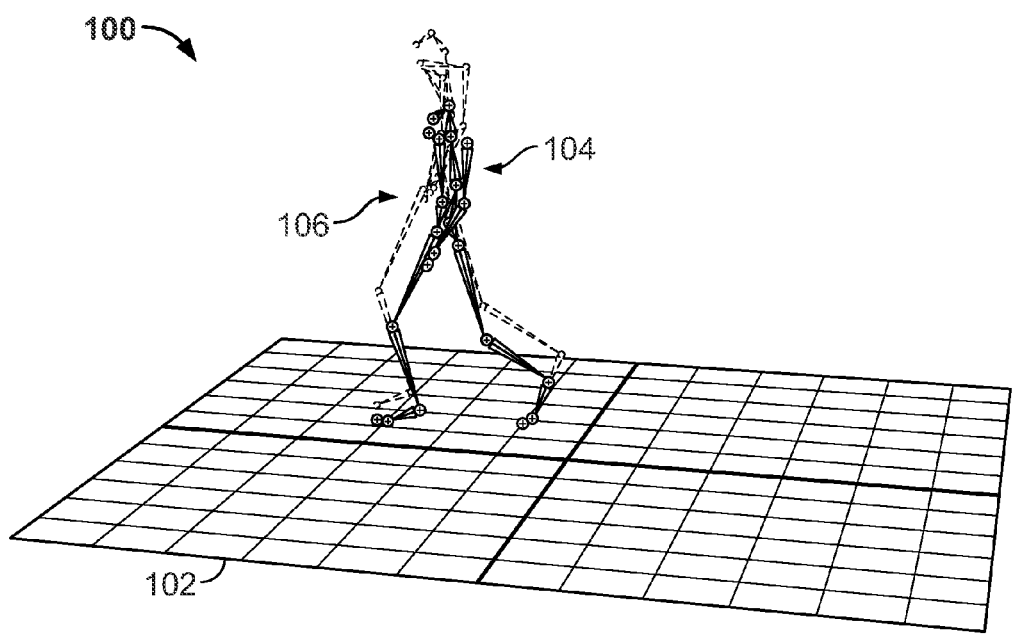
Figure 10E:
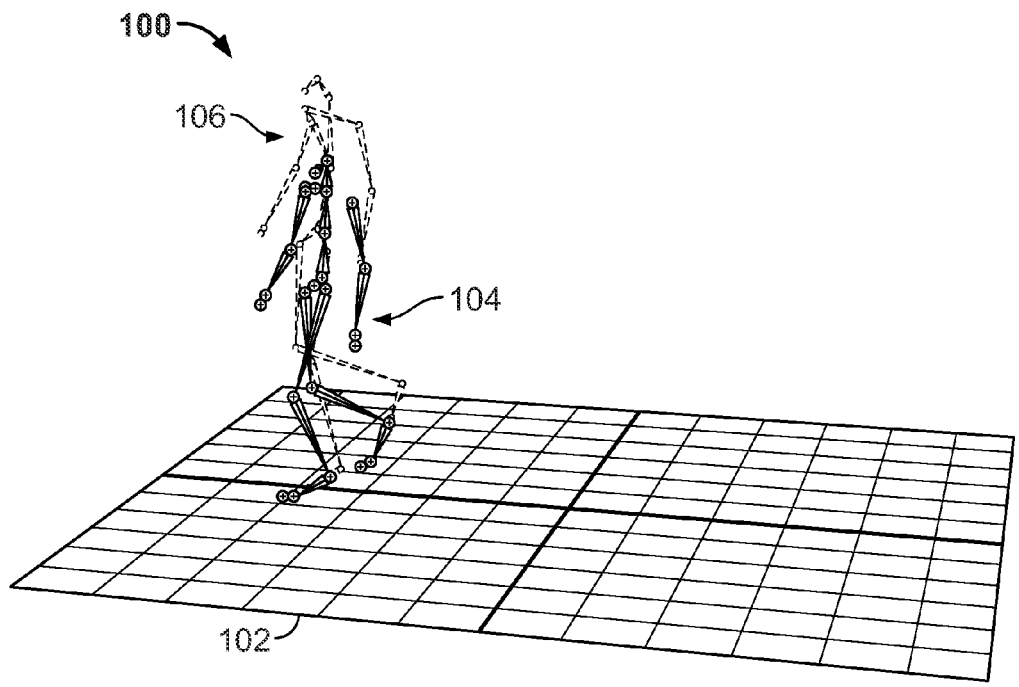
Figure 10F:
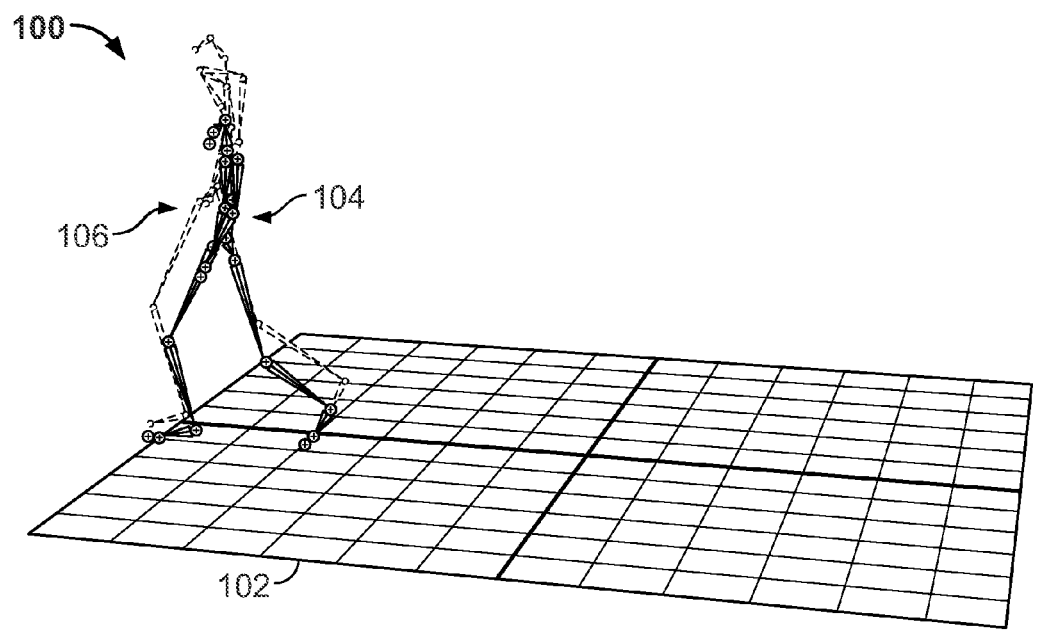

In the initial position of FIG. 10A, it is seen that the feet of the character skeleton are now constrained to not pass lower than the plane 1002. In FIG. 10B, the root is matched, and the feet scaled, while honoring the constraint. For example, this is done so that the system seeks to match the roots, and scale the feet, to the extent that it does not violate the ground constraint. Continuing with FIGS. 10C-F, they illustrate that the character skeleton 1004B can be provided with a relatively humanlike posture and behavior by applying a ground constraint while matching the root and scaling the feet.

Figure 11:
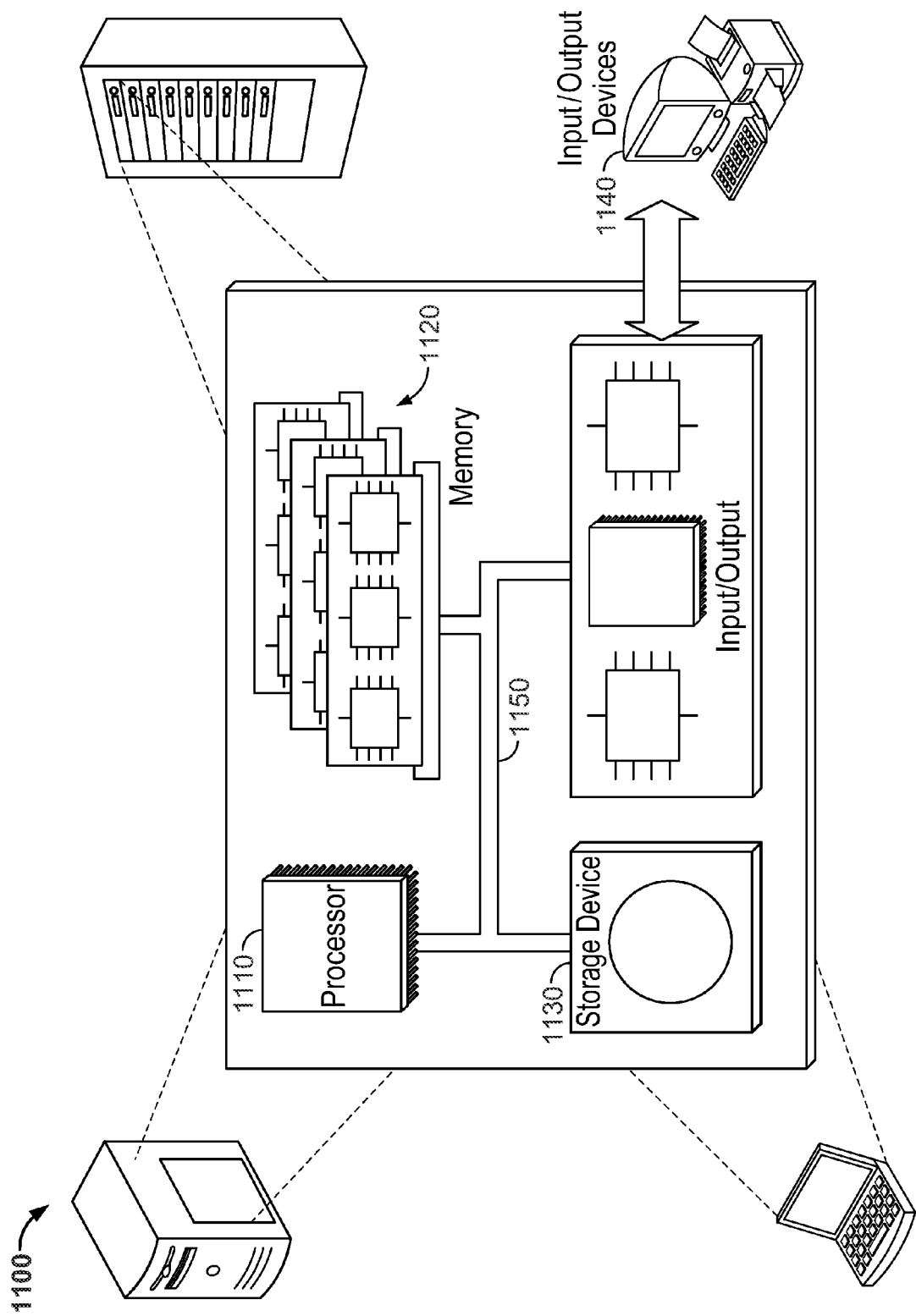
FIG. 11 is a block diagram of a computing system that can be used in connection with computer-implemented methods described in this document.

FIG. 11 is a schematic diagram of a generic computer system 1100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In some implementations, the memory 1120 is a computer-readable medium. The memory 1120 is a volatile memory unit in some implementations and is a non-volatile memory unit in other implementations.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method for providing retargeting of actor motion to a virtual character, the method comprising:
enabling a user to select one or more real-time constraint scenarios from a plurality of real-time constraint scenarios, each real-time constraint scenario corresponding to a relationship between motion capture information from an actor and a position or movement of a character having a plurality of limbs driven by the motion capture information;
receiving, in a computer system, input generated by user selection of the one or more real-time constraint scenarios;
activating, based on the one or more selected real-time constraint scenarios, a first limb solver associated with a first limb in the plurality of limbs to calculate at least a first joint angle for the first limb, wherein the first limb solver is configured to calculate movement of the first limb from the motion capture information;
based on the one or more selected real-time constraint scenarios, obtaining a corresponding joint angle for a second limb in the plurality of limbs directly from the motion capture information and registering the corresponding joint angle as a second joint angle for a second limb in the plurality of limbs without activating a second limb solver configured to calculate movement of the second limb from the motion capture information; and determining a root location for the character based on at least the first and second joint angles.

2. The method of claim 1, wherein at least one of the real-time constraint scenarios involves maintaining a pose of the actor.

3. The method of claim 1, wherein at least one of the real-time constraint scenarios involves maintaining a height proportion between the character and the actor.

4. The method of claim 1, wherein at least one of the real-time constraint scenarios involves imposing a ground constraint on the character.

5. The method of claim 1, wherein each of the real-time constraint scenarios is associated with one or more parameter values for at least one of the limb solvers, and wherein in response to the user selection the corresponding one or more parameter values are provided to the at least one of the limb solvers.

6. The method of claim 1, further comprising receiving another user input that is distinct from the motion capture information and that specifies a location for a part of the character, and adjusting the character so that the part of the character is at the specified location.

7. The method of claim 1, further comprising receiving user input distinct from the motion capture information that specifies a rotational offset for at least one character joint relative to the motion capture information, adjusting the character so that the character joint has the specified rotational offset, and propagating the rotational offset in a joint hierarchy based on the character joint.

8. The method of claim 7, further comprising receiving additional user input distinct from the motion capture information that specifies an offset adjustment for the rotational offset, and modifying the character according to the offset adjustment, wherein the offset adjustment is not propagated in the joint hierarchy.

9. The method of claim 1 wherein the plurality of real-time constraint scenarios includes a scenario that maintains a pose of the actor, a scenario that maintains a height proportion between the character and the actor, and a scenario that imposes a ground constraint on the character.

10. The method of claim 1 wherein the virtual character has a plurality of limbs each of which has an associated joint angle, and a manner in which the joint angle for each limb in the plurality of limbs for a pose of the virtual character is determined is based on the one or more selected real-time constraint scenarios such that joint angles for a first subset of the plurality of limbs are calculated by one or more limb solvers and joint angles for the remaining limbs in the plurality of limbs are obtained directly from the motion capture information without being calculated by a limb solver.

11. The method of claim 10 wherein each limb in the plurality of limbs is associated with a single limb solver and joint angles for the first subset of the plurality of limbs are calculated by a corresponding plurality of limb solvers and each limb solver associated with a remaining limb in the plurality of limbs is not used to calculate its associated joint angle.

12. The computer-implemented method of claim 11 further comprising setting a pose of the character when all joint angles have been defined.

13. A computer program product tangibly embodied in a non-transitory computer-readable storage medium and comprising instructions that when executed by a processor perform a method comprising:

enabling a user to select one or more real-time constraint scenarios from a plurality of real-time constraint scenarios, each real-time constraint scenario corresponding to a relationship between motion capture information from an actor and a position or movement of a character having a plurality of limbs driven by the motion capture information;

receiving, in a computer system, input generated by user selection of the one or more real-time constraint scenarios;

activating, based on the one or more selected real-time constraint scenarios a first limb solver associated with a first limb in the plurality of limbs to calculate at least a first joint angle for the first limb, wherein the first limb solver is configured to calculate movement of the first limb from the motion capture information;

based on the one or more selected real-time constraint scenarios, obtaining a corresponding joint angle for a second limb in the plurality of limbs directly from the motion capture information and registering the corresponding joint angle as a second joint angle for a second limb in the plurality of limbs without activating a second limb solver configured to calculate movement of the second limb from the motion capture information; and determining a root location for the character based on at least the first and second joint angles.

14. A computer program product tangibly embodied in a non-transitory computer-readable storage medium, the computer program product including instructions that, when executed, generate on a display device a graphical user interface comprising:

a first area presenting a real-time view of a character driven by motion capture information from an actor; and a second area in which a plurality of real-time constraint scenarios are presented to the user for selection, each real-time constraint scenario corresponding to a relationship between the motion capture information and a position or movement of the character having a plurality of limbs driven by the motion capture information; the instructions further comprising instructions, that when executed by a processor, perform a method that:

enables the user to select one or more real-time constraint scenarios from the plurality of real-time constraint scenarios;

activates, based on the one or more selected real-time constraint scenarios a first limb solver associated with a first limb in the plurality of limbs to calculate at least a first joint angle for the first limb;

based on the one or more selected real-time constraint scenarios, obtains a corresponding joint angle for a second limb in the plurality of limbs directly from the motion capture information and registers the corresponding joint angle as a second joint angle for a second limb in the plurality of limbs without activating a second limb solver configured to calculate movement of the second limb; and determines a root location for the character based on at least the first and second joint angles.

15. The computer program product of claim 14, wherein the second area includes a maintain pose control.

16. The computer program product of claim 14, wherein the second area includes a maintain height control.

17. The computer program product of claim 14, wherein the second area includes a ground constraint control.

18. The computer program product of claim 14, the graphical user interface further comprising a third area for the user to specify, distinct from the motion capture information, a location for a part of the character, wherein the character is adjusted so that the part of the character is at the specified location.

19. The computer program product of claim 14, the graphical user interface further comprising a third area for the user to specify, distinct from the motion capture information, a rotational offset for at least one character joint relative to the motion capture information, wherein the character is adjusted so that the character joint has the specified rotational offset, and the rotational offset is propagated in a joint hierarchy based on the character joint.

20. The computer program product of claim 19, wherein the user also specifies, using the third area and distinct from the motion capture information, an offset adjustment for the rotational offset, wherein the character is adjusted according to the offset adjustment, and the offset adjustment is not propagated in the joint hierarchy.

21. The computer-readable memory of claim 14 wherein the plurality of real-time constraint scenarios includes a scenario that maintains a pose of the actor, a scenario that maintains a height proportion between the character and the actor, and a scenario that imposes a ground constraint on the character.

22. A system comprising:
   a motion capture device that detects motion capture information from an actor;
   a stance solver and multiple limb solvers for a character driven by the motion capture information, the stance solver and multiple limb solvers receiving the detected motion capture information;
   a graphical user interface component configured to present to a user a plurality of real-time constraint scenarios, each real-time constraint scenario corresponding to a relationship between motion capture information from an actor and a position or movement of a character having a plurality of limbs driven by the motion capture information; and
   an input device configured to enable a user to select at least one of the plurality of real-time constraint scenarios;
   wherein, based on the one or more selected real-time constraint scenarios, the system: (i) activates a first limb solver associated with a first limb in the plurality of limbs to calculate a first joint angle for the limb, and (ii) obtains a corresponding joint angle for a second limb in the plurality of limbs directly from the motion capture information and registers the corresponding joint as a second joint angle for a second limb in the plurality of limbs without activating a second limb solver configured to calculate movement of the second limb; and wherein the stance solver determines a root location for the character based on at least the first and second joint angles.

23. The system of claim 22, wherein the input device receives another user input that is distinct from the motion capture information and that specifies a location for a part of the character, and wherein the system adjusts the character so that the part of the character is at the specified location.

24. The system of claim 22, wherein the input device receives another user input that is distinct from the motion capture information and that specifies a rotational offset for at least one character joint relative to the motion capture information, and wherein the system adjusts the character so that the character joint has the specified rotational offset, and propagates the rotational offset in a joint hierarchy based on the character joint.

25. The system of claim 24, wherein the input device receives an additional user input that is also distinct from the motion capture information and that specifies an offset adjustment for the rotational offset, and wherein the system modifies the character according to the offset adjustment, and does not propagate the offset adjustment in the joint hierarchy.

26. The system of claim 22 wherein the plurality of real-time constraint scenarios includes a scenario that maintains a pose of the actor, a scenario that maintains a height proportion between the character and the actor, and a scenario that imposes a ground constraint on the character.

* * * * *

UNITED STATES PATENT AND TRADEMARK OFFICE
CERTIFICATE OF CORRECTION

| | | |
|---|---|---|
| PATENT NO. | : 9,001,132 B1 | |
| APPLICATION NO. | : 13/324808 | |
| DATED | : April 7, 2015 | |
| INVENTOR(S) | : Kevin Wooley, Kiran S. Bhat and Michael Sanders | |

It is certified that error appears in the above-identified patent and that said Letters Patent is hereby corrected as shown below:

In the Claims

In Claim 22, column 20, lines 7, please insert the word --angle-- between the words "Joint" and "as" so that the line reads:

information and registers the corresponding joint angle as a

Signed and Sealed this
Twenty-fifth Day of August, 2015

Michelle K. Lee
*Director of the United States Patent and Trademark Office*